(12) United States Patent
Tago et al.

(10) Patent No.: US 8,781,980 B2
(45) Date of Patent: Jul. 15, 2014

(54) MATCHING PATTERN OF EVENTS WITH INTERVAL CONDITIONS

(75) Inventors: Shinichiro Tago, Shinagawa (JP); Tatsuya Asai, Kawasaki (JP); Hiroya Inakoshi, Tama (JP); Nobuhiro Yugami, Minato (JP); Seishi Okamoto, Hachioji (JP); Hiroaki Morikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 13/444,187

(22) Filed: Apr. 11, 2012

(65) Prior Publication Data
US 2012/0330868 A1    Dec. 27, 2012

(30) Foreign Application Priority Data
Jun. 27, 2011    (JP) .................. 2011-142279

(51) Int. Cl.
*G06F 15/18* (2006.01)
*G06N 99/00* (2010.01)
*G06F 17/30* (2006.01)

(52) U.S. Cl.
CPC ........ *G06N 99/005* (2013.01); *G06F 17/30985* (2013.01)
USPC .......................................................... 706/12

(58) Field of Classification Search
CPC ...................... G06N 99/005; G06F 17/30985
See application file for complete search history.

(56) References Cited

U.S. PATENT DOCUMENTS

2003/0195874 A1* 10/2003 Akaboshi ......................... 707/3
2009/0006320 A1* 1/2009 Ding et al. ........................ 707/2

OTHER PUBLICATIONS

Brenna et al. "Distributed Event Stream Processing with Non-deterministic Finite Automata", DEBS, 2009, pp. 12.*
A. Demers, et al., Cayuga: A General Purpose Event Monitoring System (2007), pp. 412-422.
J. Agrawal, et al., Efficient Pattern Matching over Event Streams (2008), pp. 147-159.

* cited by examiner

*Primary Examiner* — Li-Wu Chang
(74) *Attorney, Agent, or Firm* — Fujitsu Patent Center

(57) ABSTRACT

The matching apparatus 100 stores, with respect to a branching pattern included in event patterns 140*a*, a reception time of an event that serves as the branching point in a source node that indicates the transition destination of the event, connects the source node to the branch node by a transition with an interval condition, connects the branch nodes to the link node that indicates the linking point at which these branch nodes are linked together, and thereby generates NFAs 140*b*. Then, the matching apparatus 100 compares event streams 140*c* with the NFAs 140*b* to determine whether the event streams 140*c* includes the event patterns 140*a*.

5 Claims, 34 Drawing Sheets

FIG.3

| EVENT STREAM | A | C | A | B | A | B | E | C | E | A | ... |
|---|---|---|---|---|---|---|---|---|---|---|---|
| TIME | 1 | 2 | 3 | 4 | 5 | 6 | 7 | 8 | 9 | 10 | ... |

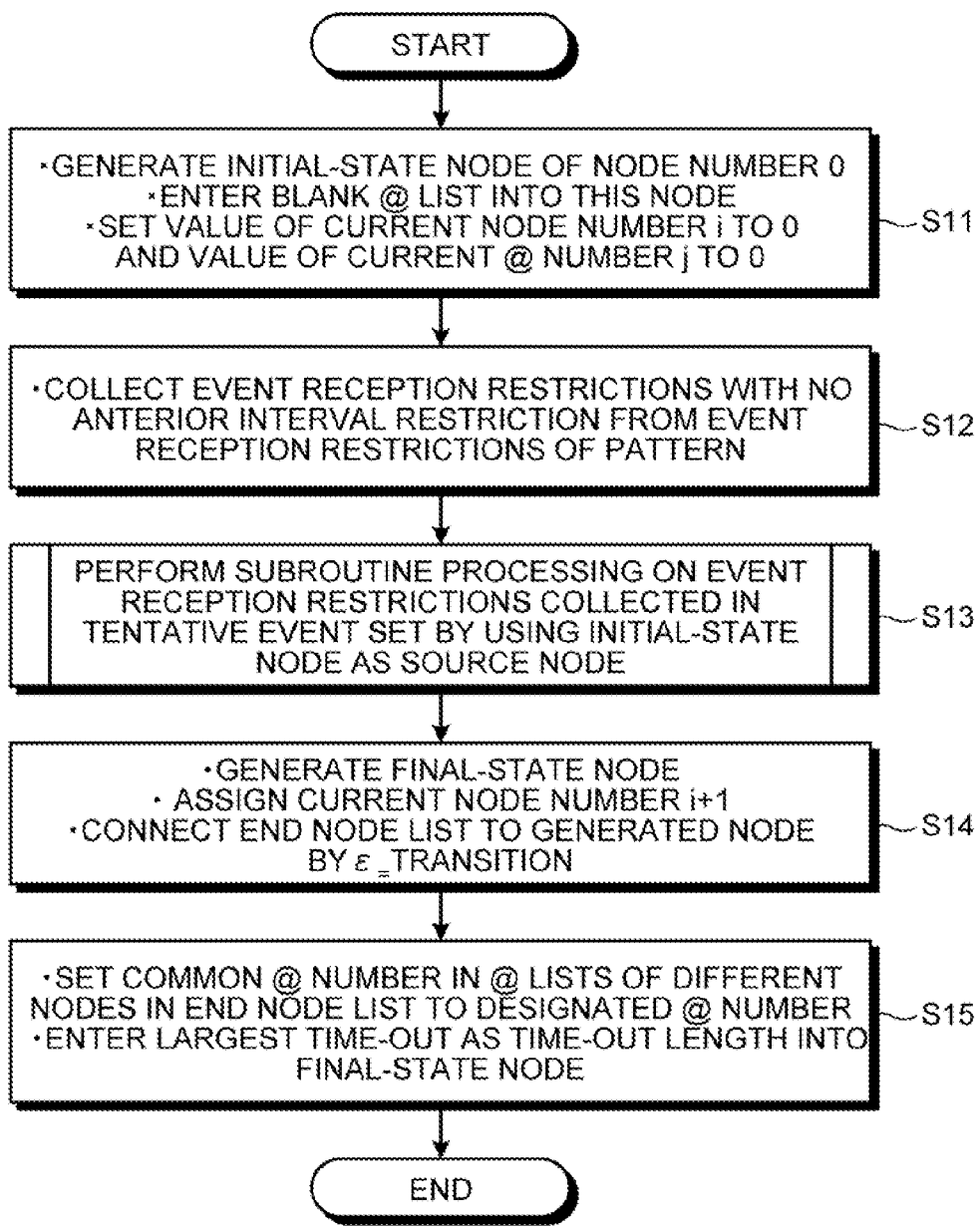

··· a n z a b x y c n z n c n ···

10a  10b 10c 10d

| EVENT | DESCRIPTION |
|---|---|
| c | −30 km/h or less (abrupt deceleration) |
| b | −30 to −15 km/h |
| a | −15 to −5 km/h |
| n | −5 to 5 km/h |
| x | 5 to 15 km/h |
| y | 15 to 30 km/h |
| z | 30 km/h or more (abrupt acceleration) |

MATCHING PATTERN OF EVENTS WITH INTERVAL CONDITIONS

CROSS-REFERENCE TO RELATED APPLICATION(S)

This application is based upon and claims the benefit of priority of the prior Japanese Patent Application No. 2011-142279, filed on Jun. 27, 2011, the entire contents of which are incorporated herein by reference.

FIELD

The embodiment discussed herein is directed to a matching apparatus and the like.

BACKGROUND

With the development and spread of the network technology and sensor technology, an event stream processing has been attracting attention, which is aiming at real-time processing of a series of events that massively occur every moment. In the following description, a series of events is referred to as an event stream. In the field of event stream processing, special emphasis has been placed on an event pattern matching technology for detecting a pattern of an event arrival order, and various methods have been suggested.

Three features may be required for the event pattern matching, as indicated below. The first feature is now explained. In the event pattern matching, any noise event that appears in the middle of the event stream may be ignored. Here, a noise event is any event other than a matching target event.

The second feature is now explained. The event pattern matching may be conducted efficiently onto any of pattern expressions such as a parallel pattern and a selective pattern. For example, a parallel pattern for an event A and an event B is expressed as "A&B". When both of the events A and B are found in the event stream in random order, matching for "A&B" is achieved. On the other hand, a selective pattern for the event A and the event B is expressed as "A∨B". If either one of event A or B is found in the event stream, matching for "A∨B" is achieved.

The third feature is now explained. The event pattern matching may be conducted to find an event pattern in which a certain event arrives within a predetermined period of time after another event. In this manner, two events that are irrelevant to each other with a large time difference therebetween would not be chosen for matching.

Next, an example of a conventional event pattern matching technology is explained. FIG. 19 is a diagram for explaining the conventional technology. As indicated in FIG. 19, an event stream 10 includes events a, n, z, a, b, x, y, c, n, z . . . , which indicate velocity differences of every five seconds in the motion of an automobile. FIG. 20 is a diagram for associating the events with descriptions of the events. As illustrated in FIG. 20, the event c represents an abrupt deceleration of −30 km/h or smaller, the event b represents −30 to −15 km/h, and the event a represents −15 to −5 km/h. Furthermore, the event n represents −5 to 5 km/h, the event x represents 5 to 15 km/h, the event y represents 15 to 30 km/h, and the event z represents an abrupt acceleration of 30 km/h or greater.

Here, an event pattern P in which the abrupt deceleration (c) occurs within 10 seconds after the abrupt acceleration (z) will be considered. With a conventional technology, the event stream 10 indicated in FIG. 19 is compared with the event pattern P. Then, an event z is found at a position 10$a$ of the event stream 10, and an event c is found at a position 10$b$. However, it takes 25 seconds to receive the event c at the position 10$b$ after receiving the event z at the position 10$a$, and therefore the event pattern P is not detected here. Then, another event z is found at a position 10$c$, and another event c is found at a position 10$d$. Here, it takes 10 seconds to receive the event c at the position 10$d$ after receiving the event z at the position 10$c$, and therefore the event pattern P is detected.

With the conventional technology, when comparing an event stream with an event pattern, a nondeterministic finite automaton (NFA) that corresponds to the event pattern is generated and used. In the following description, a nondeterministic finite automaton is simply referred to as an automaton. FIG. 21 is a diagram for illustrating a conventional automaton generated from an event pattern. An automaton 20 of FIG. 21 corresponds to a parallel pattern of events indicated by an event pattern Q, to which interval conditions are attached. In other words, the event pattern Q is a pattern of events with interval conditions, in which events b, c, and d are received within an interval specified above each arrow after receiving the event a, and an event e is received within an interval specified above each arrow after receiving the events b, c, and d.

The automaton 20 includes nodes 21, 22, 23$a$ to 23$f$, 24$a$ to 24$f$, 25$a$ to 25$f$, 26$a$ to 26$f$, 27, and 28 that are connected to one another. With the conventional technology, all the combinations of "{b:(2:a)}, {c:(4:a)}, and {d:(2:a)}" in different occurrence orders are expressed with the nodes 23$a$ to 23$f$, 24$a$ to 24$f$, 25$a$ to 25$f$, 26$a$ to 26$f$ so as to correspond to a parallel event pattern "{b:(2:a)}&{c:(4:a)}&{d:(2:a)}" with interval conditions in the event pattern Q. Here, {b:(2:a)} means that the event b is received after the event a with an interval of 2 or smaller between the two events, while {c:(4:a)} means that the event c is received after the event a with an interval of 4 or smaller between the two events. Further, {d:(2:a)} means that an event d is received after the event a with an interval of 2 or smaller between the two events. Then, an event e is received with intervals in reception time between the events b and e being 6 or smaller, between the events c and e being 4 or smaller, and between the events d and e being 4 or smaller. A transition of the nodes in the automaton 20 is activated when an event with an interval condition specified above the arrow occurs. For example, when reaching the position of the event a in the event stream, the transition from the node 21 to the node 22 is activated.

Here, ε in the automaton 20 represents an ε transition. For example, when a transition from the node 21 to the node 22 is activated, ε transitions from the node 22 to the nodes 23$a$ to 23$f$ are activated.

BACKGROUND ART

Non-Patent Literature

Non-patent Document 1: A. Demers, et al., "Cayuga: A General Purpose Event Monitoring System", Proc. CIDR '07

Non-patent Document 2: J. Agrawal, et al., "Efficient Pattern Matching over Event Streams", Proc. SIGMOD '08

SUMMARY

According to an aspect of an embodiment of the invention, a matching apparatus includes an automaton generating unit configured to generate an automaton by performing, onto a branching pattern included in an event pattern that has an occurrence order of events and an interval condition, a process of storing a reception time of an event that serves as a branching point of the branching pattern in association with a source node that indicates a transition destination of the event, a process of connecting the source node to a branch node that brings an event that is a branch of the branching pattern into association with the interval condition, and a process of connecting multiple branch nodes to a link node that indicates a linking point at which the branch nodes are linked together, and a matching unit configured to determine whether an event stream includes the event pattern by sequentially comparing the event stream that includes the occurrence order of the events with the automaton, storing, when the event that is the branching point of the branching pattern is received by the source node, a reception time of the event that is received in association with the source node, transferring the reception time that is stored, together with a reception state of the branch node, if reception of the event that is received satisfies the interval condition associated with the branch node when an event subsequent to the event that is the branching point is received by the branch node, and further transferring, a linking state that, if any of reception times transferred from the branch nodes includes the same reception time at the link node, includes the same reception time.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram for illustrating an example data structure of an event stream;

FIG. 10 is a flowchart of the main NFA constructing process performed by the NFA generating unit;

DESCRIPTION OF EMBODIMENT

Preferred embodiment of the present invention will be explained with reference to accompanying drawings.

This embodiment is not to limit the present invention.

Structure of Matching System According to Present Embodiment

Figure 1:
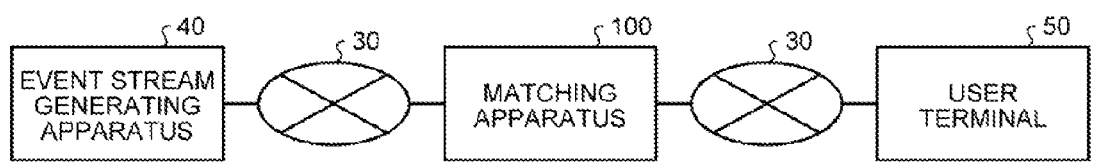
FIG. 1 is a diagram for illustrating the structure of a matching system according to the present embodiment.

An example of the structure of a matching system according to the present embodiment is now explained. FIG. 1 is a diagram for illustrating the structure of the matching system according to the present embodiment. As illustrated in FIG. 1, the matching system includes an event stream generating apparatus 40, a user terminal 50, and a matching apparatus 100. The matching apparatus 100 is connected to the event stream generating apparatus 40 and the user terminal 50 by way of a network 30.

The event stream generating apparatus 40 generates an event stream that includes a series of events. The event stream generating apparatus 40 sends information of the event stream to the matching apparatus 100.

The user terminal 50 sends an event pattern to the matching apparatus 100, and receives the matching result from the matching apparatus 100.

The matching apparatus 100 checks to determine whether an event pattern is included in an event stream. The matching apparatus 100 sends the matching result to the user terminal 50.

Structure of Matching Apparatus According to Present Embodiment

Figure 2:
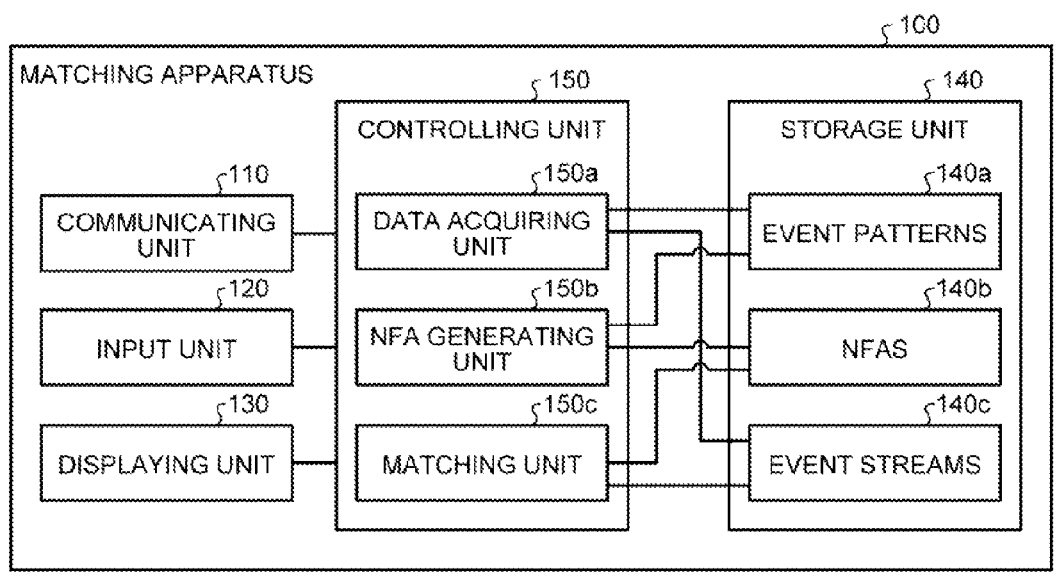
FIG. 2 is a functional block diagram for illustrating the structure of a matching apparatus according to the present embodiment.

The structure of the matching apparatus 100 illustrated in FIG. 1 is now explained. FIG. 2 is a functional block diagram for illustrating the structure of the matching apparatus according to the present embodiment. As illustrated in FIG. 2, this matching apparatus 100 includes a communicating unit 110, an input unit 120, a displaying unit 130, a storage unit 140, and a controlling unit 150.

The communicating unit 110 is a processing unit that performs data communications with the event stream generating apparatus 40 and the user terminal 50 by way of the network 30. The controlling unit 150 that is described later receives information of event streams and event patterns by way of the communicating unit 110. The communicating unit 110 corresponds to a communicating device, a communicating card, and the like that performs data communications by use of a certain communication protocol.

The input unit 120 is an input device used by the user to input various types of information to the matching apparatus 100. For example, the input unit 120 corresponds to a keyboard, a mouse, and a touch panel. The displaying unit 130 is a display device to display various types of information. For example, the displaying unit 130 corresponds to a display or a touch panel.

The storage unit 140 stores therein event patterns 140a, nondeterministic finite automatons (NFAs) 140b, and event streams 140c. The storage unit 140 corresponds, for example, to a semiconductor memory device such as a random access memory (RAM), a read only memory (ROM), and a flash memory, or a storage device such as a hard disk and an optical disk.

The event patterns 140a are used for matching of the event streams 140c. It is assumed here that the event pattern according to the present embodiment is a parallel pattern of events with interval conditions. For example, it is assumed that the event patterns 140a are branching patterns of "P={b: (2:a)}&{c:(5:a)}". Or, it may be assumed that the event patterns 140a are linking patterns of "{e:(6:b)}&{e:(4:c)}". In this event pattern, a, b, c, d, and e correspond to events a, b, c, d, and e, respectively. Here, {b:(2:a)} denotes that the event b is received with an interval between the events a and b being 2 or smaller. The denotation of {c:(5:a)}, {e:(6:b)} and {e:(4:c)} can be interpreted in the same manner, and thus detailed explanation is omitted here.

In the event pattern, the symbol "&" indicates to find all the corresponding events in random order. For example, "A&B" is a parallel pattern to find both events A and B in random order.

The NFAs 140b are nondeterministic finite automatons generated based on the event patterns 140a. The event streams 140c are data that include a series of events. FIG. 3 is a diagram for illustrating an example data structure of an event stream. As indicated in FIG. 3, the event streams 140c store therein event streams each of which is a series of events in association with times at which the events occur.

The controlling unit 150 includes a data acquiring unit 150a, an NFA generating unit 150b, and a matching unit 150c. For example, the controlling unit 150 corresponds to an integrated device such as an application specific integrated circuit (ASIC) and a field programmable gate array (FPGA). Furthermore, the controlling unit 150 corresponds to, for example, an electronic circuit such as a CPU and a micro processing unit (MPU).

The data acquiring unit 150a is a processing unit that acquires an event stream from the event stream generating apparatus 40 and an event pattern from the user terminal 50. The data acquiring unit 150a stores the event pattern and the event stream in the storage unit 140 as the event patterns 140a and the event streams 140c.

The NFA generating unit 150b is a processing unit that generates the NFAs 140b based on the event patterns 140a. The NFA generating unit 150b stores the generated NFAs 140b in the storage unit 140. The NFA generating unit 150b employs the Thompson NFA method to generate an NFA, but the method is not limited thereto. Any conventional technology may be adopted to generate an NFA.

The NFA constructing method adopted by the NFA generating unit 150b is now explained. FIGS. 4 to 7 are diagrams for explaining the NFA constructing method used by the NFA generating unit.

Figure 4:
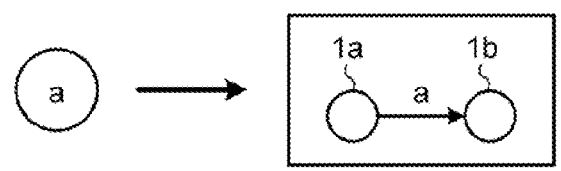
FIG. 4 is a diagram for explaining an NFA constructing method used by an NFA generating unit.

An NFA for a single event is indicated in FIG. 4. FIG. 4 is a diagram for illustrating an NFA for a single event. The NFA generating unit 150b connects a node 1a to a node 1b, and when receiving an event a, it generates an NFA that effects an unconditional transition from the node 1a to the node 1b. A normal transition in which an unconditional transition from one node to another is effected is referred to as "normal transition without any interval condition".

Figure 5:
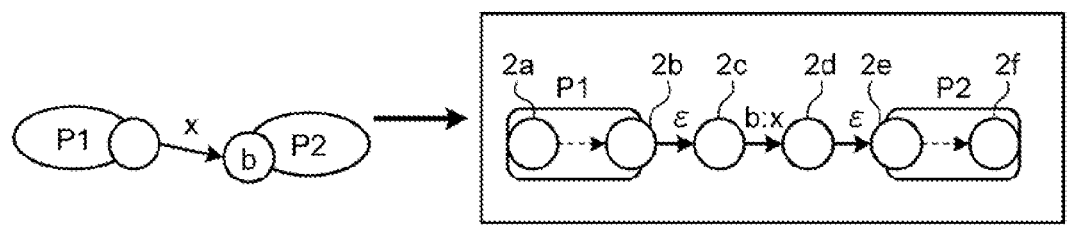
FIG. 5 is a diagram for explaining the NFA constructing method used by the NFA generating unit.

An NFA for a noncontiguous serial pattern is the one as indicated in FIG. 5. FIG. 5 is a diagram for illustrating an NFA for a noncontiguous serial pattern. In FIG. 5, b denotes an event, while x denotes an interval condition between events. Further, P1 and P2 each denote a set of events.

The NFA generating unit 150b connects a node 2a to a node 2b, the node 2b to a node 2c, and the node 2c to a node 2d. In addition, the NFA generating unit 150b connects the node 2d to a node 2e, and the node 2e to a node 2f. In FIG. 5, the transition from the node 2b to the node 2c and the transition from the node 2d to the node 2e are each referred to as an "ε transition". For example, when an event P1 effects the transition from the node 2a to the node 2b, the transition from the node 2b to the node 2c is activated.

In FIG. 5, it is assumed that the transition from the node 2c to the node 2d is a transition b:x with an event interval condition. More specifically, when the node 2c receives an event b, the transition from the node 2c to the node 2d is effected if an interval condition x is satisfied between this event and the event already received by the node 2c. A normal transition effected from one node to another node after checking an interval condition is referred to as a "normal transition with an interval condition".

Figure 6:
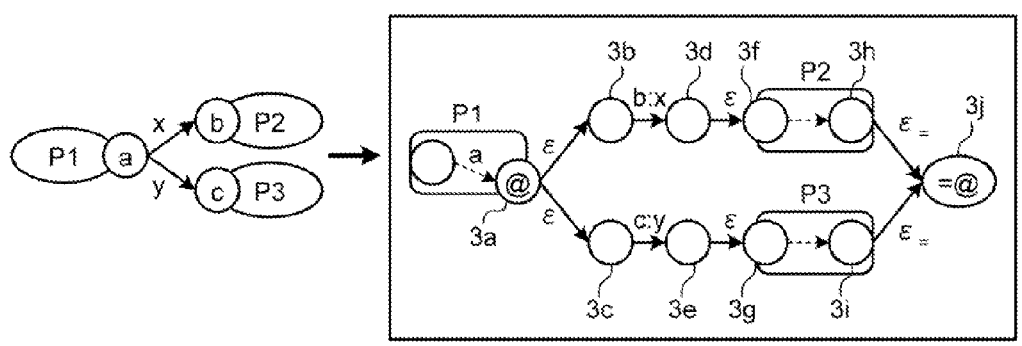
FIG. 6 is a diagram for explaining the NFA constructing method used by the NFA generating unit.

An NFA for a branching pattern is illustrated in FIG. 6. FIG. 6 is a diagram for illustrating an NFA corresponding to a branching pattern. In FIG. 6, a, b, and c denote different events, while x and y denote different interval conditions between events. Furthermore, P1, P2, and P3 each denote a set of events.

The NFA generating unit 150b causes the reception time of the event a, which is the branching point of the branching pattern, to be associated with and stored in a node 3a that is a transition destination of the event a. Here, a node that holds the reception time of an event is referred to as a "reception time holding node" (which corresponds to a source node). In the example of FIG. 6, the reception time holding node is indicated by "@". Then, the NFA generating unit 150b assigns the @ number that is a uniquely determined identifier for the reception time to the reception time holding node, in association with the event a of the branching point.

Moreover, the NFA generating unit 150b connects the node 3a to nodes 3b and 3c that are branched therefrom, by ϵ transition. In addition, the NFA generating unit 150b connects the node 3b to a node 3d by normal transition "b:x" with an interval condition. As a result, the node 3b receives the event b, and then the transition from the node 3b and the node 3d is activated if the interval condition x is satisfied between this event and the event previously transferred to the node 3b. Furthermore, the NFA generating unit 150b connects the node 3c to a node 3e by normal transition "c:y" with an interval condition. As a result, the node 3c receives the event c, and then the transition from the node 3c to the node 3e is activated if the interval condition y is satisfied between this event and the event previously transferred to the node 3c.

In addition, the NFA generating unit 150b connects the node 3d to a node 3f by ϵ transition, and the node 3e to a node 3g by ϵ transition. Moreover, the NFA generating unit 150b connects each of the nodes 3h and 3i to a node 3j by ϵ_transition. Here, a node connected from more than one node by ϵ_transition, or in other words, a node that indicates a link where multiple nodes are connected is referred to as a "merging node" (which corresponds to a link node). In the example of FIG. 6, the merging node 3j is indicated as "=@". In other words, the NFA generating unit 150b has the merging node 3j determine whether there are any reception times of the event a that are the same time when it is transferred from the multiple nodes, 3h and 3i.

Figure 7:
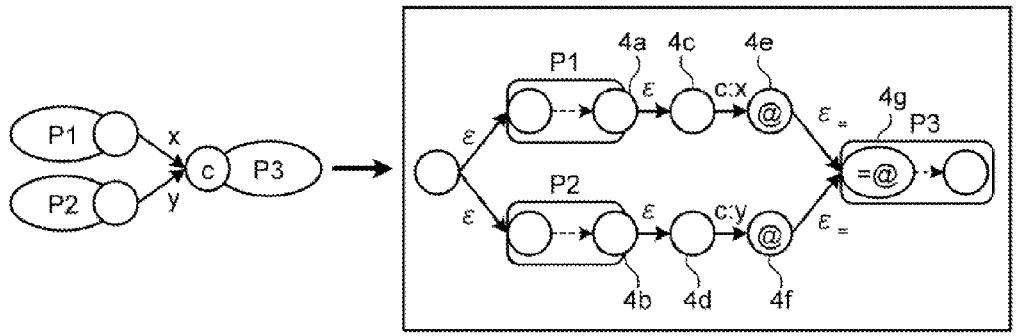
FIG. 7 is a diagram for explaining the NFA constructing method used by the NFA generating unit.

An NFA for a linking pattern is illustrated in FIG. 7. FIG. 7 is a diagram for illustrating an NFA corresponding to a linking pattern. In FIG. 7, c denotes an event, and x and y denote different interval conditions between events. Moreover, P1, P2, and P3 each denote a set of events. Transitions from node 4a to 4c, and 4b to 4d are the same manner as the transition from the node 2b to the node 2c, and thus detailed explanation is omitted here.

The NFA generating unit 150b brings the reception time of the event c, which serves as an endpoint of the linking pattern, into association with nodes 4e and 4f that are the transition destinations of the event c. Here, the nodes 4e and 4f hold the reception time of the event c, and therefore become reception time holding nodes. In the example of FIG. 7, the nodes 4e and 4f are the reception time holding nodes and indicated by "@". Then, the NFA generating unit 150b assigns the same @ number that is as a unique identifier to the reception time holding nodes 4e and 4f, in association with the event c that serves as the endpoint of the linking.

Furthermore, the NFA generating unit 150b connects each of the nodes 4e and 4f to a node 4g by ϵ_transition. Here, the node 4g is connected from more than one node, 4e and 4f, by ϵ_transition, and thus it serves as a merging node. In the example of FIG. 7, the merging node 4g is indicated by "=@". In other words, the NFA generating unit 150b has the merging node 4g determine whether there are any reception times of the event c that are the same when it is transferred from the nodes 4e and 4f.

In FIG. 2, the matching unit 150c is a processing unit that checks an event streams 140c by use of an NFAs 140b. For example, the matching unit 150c uses the NFAs 140b to transfer the reception time of the event that serves as the branching point, together with a reception state that agrees with the interval condition, and, if there are any reception times of the event that are the same at the merging node that serves as a link point, the matching unit 150c further transfers the reception time. Then, the matching unit 150c notifies the user terminal 50 of the matching result.

For example, the matching unit 150c checks events of the event streams 140c in order, compares them with each node of the NFAs 140b, and performs the matching with respect to the branching pattern included in the NFAs 140b in the following manner. When the event that serves as the branching point of the branching pattern is received at the reception time holding node, the matching unit 150c holds the reception time of the received event in association with the reception time holding node.

Then, when an event that follows the event serving as the branching point in the event streams 140c is received at the node of the branch, the matching unit 150c determines whether the reception of the received event satisfies the interval condition that is associated with the node of the branch. when it is determined that the reception of the received event satisfies the interval condition associated with the node of the branch, the matching unit 150c transition the reception time held in association with the reception time holding node together with the reception state of the node of the branch. Here, the reception state means the state of the last event received by the node of the branch at the present moment, and it may be the reception time of the received event. If there is more than one event received by the reception time holding node, there may be more than one state in accordance with the reception times of the events.

Furthermore, the matching unit 150c determines whether there are any reception times transferred from the nodes of the branches that are the same time at the merging node. When it is determined that there are the same reception times, the matching unit 150c generates a combined state that includes this reception time and further transfers the generated combined state. Here, the combined state means, for example, the state in which the reception states corresponding to the same reception time are combined.

The matching unit 150c determines that the matching is completed at the timing of activating a transition to a final-state node, and outputs, for example, a completion time as a matching result.

Moreover, the matching unit 150c checks the events of the event streams 140c in turn, compares them with the nodes of the NFAs 140b, and performs the matching with respect to the linking pattern included in the NFAs 140b in the following manner. When an event that serves as the endpoint of the linking pattern is received at the reception time holding node, the matching unit 150c duplicates the reception state of the transferring source. Moreover, the matching unit 150c holds the reception time of the received event in association with the reception time holding node. Then, the matching unit 150c transfers the reception time to the merging node, together with the duplicated reception state.

Furthermore, the matching unit 150c determines whether there are any reception times of the endpoint event that are the same time at the merging node among the reception times transferred from the nodes of the branches. When it is determined that there are the reception times that are the same, the matching unit 150c generates a combined state that includes this reception time and further transfers the generated combined state.

Figure 8:
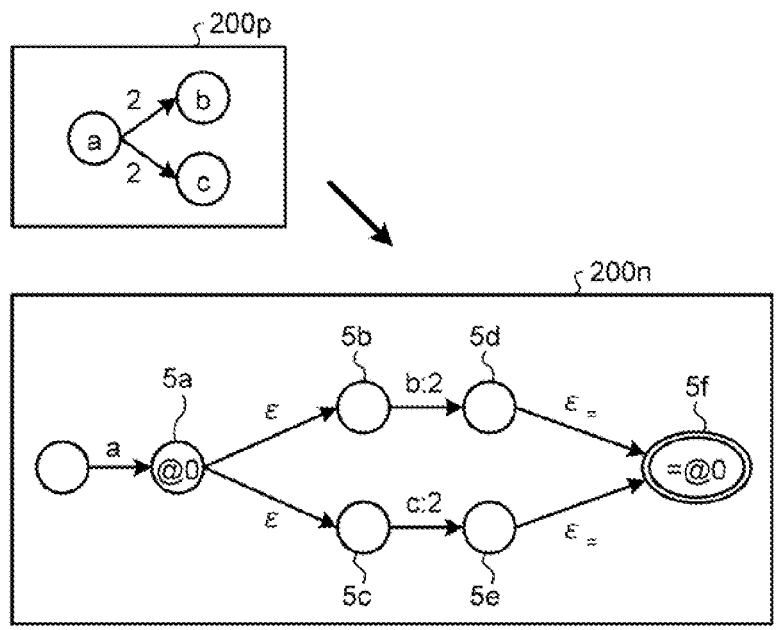
FIG. 8 is a diagram for explaining a matching performed by a matching unit.
Figure 9:
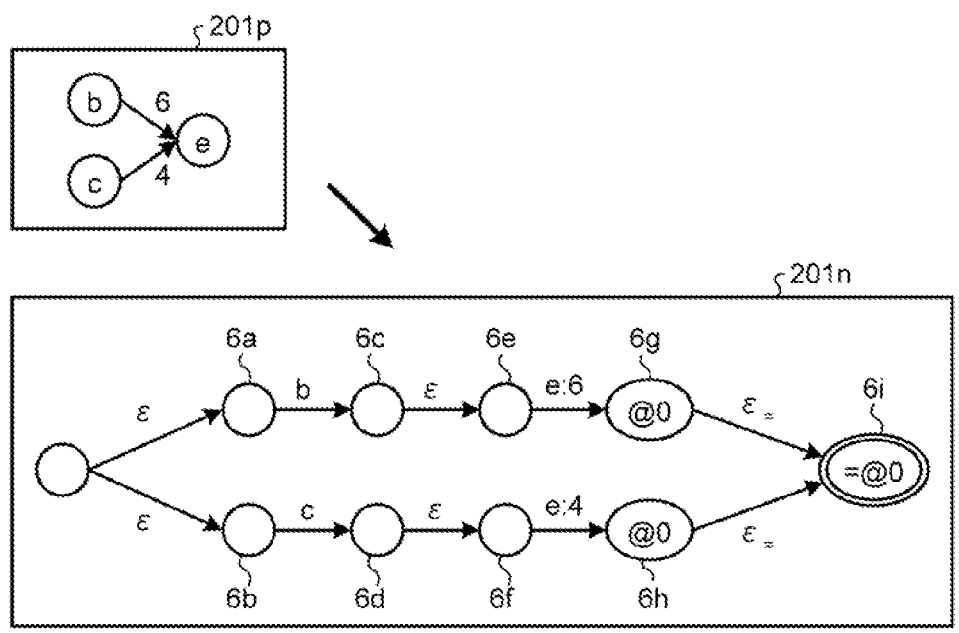
FIG. 9 is a diagram for explaining the matching performed by the matching unit.

The matching performed by the matching unit 150c is now explained. FIGS. 8 and 9 are diagrams for explaining the matching performed by the matching unit.

In FIG. 8, it is assumed that a branching pattern 200p included in the event patterns 140a has the event a as the branching point and defines the interval between the events a and b as 2 or smaller and the interval between the events a and c as 2 or smaller. An example of the NFAs 140b corresponding to the branching pattern 200p is indicated as 200n in FIG. 8. In FIG. 8, @0 in 200n represents a reception time holding node having the @ number 0. Furthermore, =@0 represents a merging node for checking the reception time of an event received at the reception time holding node having the @ number 0.

When the event a that serves as a branching point of the branching pattern in the event streams 140c are received at a reception time holding node 5a through a normal transition without any interval condition, the matching unit 150c holds the reception time of the received event a in association with the reception time holding node 5a. Then, because the event a is received at the reception time holding node 5a, the matching unit 150c activates an ϵ transition from the reception time holding node 5a to a node 5b. Here, the matching unit 150c transfers the reception state of the reception time holding node 5a to the node 5b, together with the reception time of the event a held in association with the reception time holding node 5a.

Then, when the event b that follows the event a that is the branching point in the event streams 140c are received at the node 5b of the branch, the matching unit 150c activates the normal transition with the interval condition for the received event b. Then, the matching unit 150c determines whether the reception of the event b satisfies an interval condition 2 associated with the node 5b of the branch. Here, the matching unit 150c determines whether the interval between the reception times of the event a and the event b is 2 or smaller. If the interval condition 2 is satisfied, the matching unit 150c transfers the reception time of the event a that has been transferred to the reception node 5b, to a node 5d together with the reception state of the node 5b. Then, because the event b is received at the node 5d, the matching unit 150c activates an ϵ_transition that connects the node 5d to a node 5f. Nodes 5c and 5e correspond to nodes 5b and 5d, and thus detailed explanation is omitted here.

Then, the matching unit 150c determines whether there are any reception times transferred from branch nodes 5d and 5e and corresponding to @0 that are the same time at the merging node 5f. When determining that there is the same reception time corresponding to the @0, the matching unit 150c generates from the reception states of the nodes 5d and 5e the combined state by combining the reception states corresponding to this same reception time, and further transfers the generated combined state.

In FIG. 9, a linking pattern 201p included in the event patterns 140a have an event e as the endpoint of the linkage, with the interval between the event b that is the linkage source and the event e being 6 or smaller, and the interval between the event c that is the linkage source and the event e being 4 or smaller. An example of the NFAs 140b corresponding to the linking pattern 201p is illustrated as 201n in FIG. 9. In FIG. 9, @0 in 201n represents a reception time holding node having the @ number 0. In addition, =@0 represents a merging node for checking the reception time of an event received by the reception time holding node having the @ number 0.

When the event b in the event streams 140c are received at a node 6a, the matching unit 150c activates a normal transition without any interval condition for the received event b, and transfers the reception state of the node 6a to a node 6c. Furthermore, the matching unit 150c activates an ϵ transition from the node 6c to a node 6e, and transfers the reception state of the node 6c to the node 6e. Nodes 6d and 6f correspond to nodes 6c and 6e, and thus detailed explanation is omitted here.

Then, when the event e that is the endpoint of the linkage of the linking pattern is received at the node 6e, the matching unit 150c activates a normal transition with an interval condition for the received event e. Thereafter, the matching unit 150c determines whether the reception of the event e satisfies an interval condition 6 that is associated with the node 6e. Here, the matching unit 150c determines whether the interval restriction between the reception times of the event b and the event e is 6 or smaller. If the interval condition 6 is satisfied, the matching unit 150c transfers the reception state of the node 6e to a node 6g. When the event e is received at the node 6g that is a reception time holding node, the matching unit 150c duplicates the reception state of the transition source node 6e. Then, the matching unit 150c holds the reception time of the received event e in association with the reception time holding node 6g. Thereafter, the matching unit 150c activates an ϵ_transition from the node 6g to a node 6i. Here, the matching unit 150c transfers the reception time to the merging node 6i together with the duplicated reception state.

Then, the matching unit 150c determines whether there are any reception times transferred from the nodes 6g and 6h and corresponding to @0 that are the same at the merging node 6i. When determining that there is the same reception time corresponding to @0, the matching unit 150c generates the combined state including this same reception time, and further transfers the generated combined state.

Figure 11A:
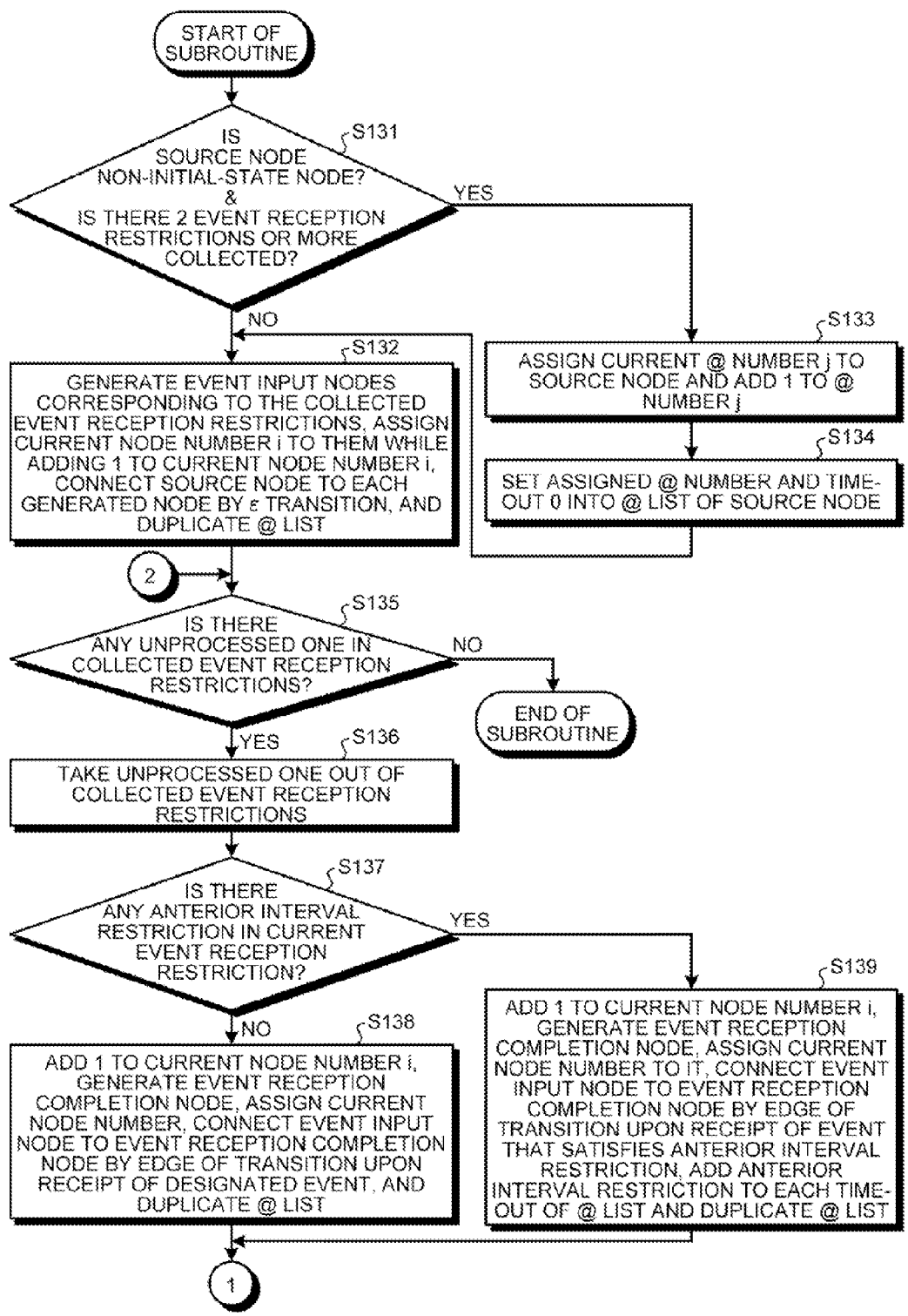
FIG. 11A is a flowchart of the procedure of a subroutine process of an NFA construction by an NFA generating unit.
Figure 11B:
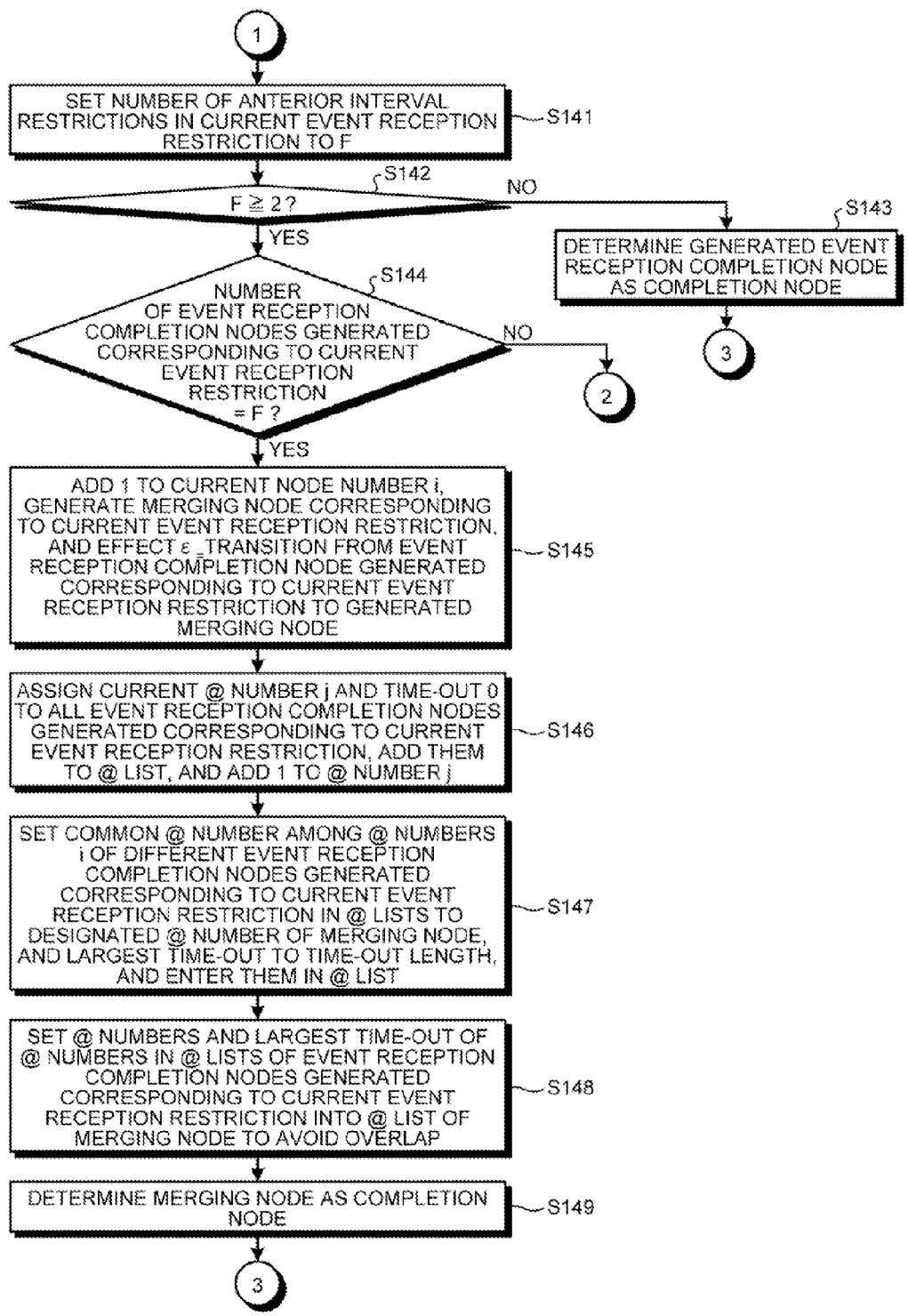
FIG. 11B is a flowchart of the procedure of the subroutine process of the NFA construction by the NFA generating unit.

NFA Construction Process Procedure Followed by NFA Generating Unit According to Present Embodiment Next, the procedure of the NFA construction process followed by the NFA generating unit 150b according to the present embodiment is explained with reference to FIGS. 10 to 11C. The procedure of the main process of the NFA construction by the NFA generating unit is illustrated in FIG. 10, and the procedure of the subroutine process of the NFA construction by the NFA generating unit is illustrated in FIGS. 11A to 11C.

Procedure of Main Process of NFA Construction

First, the procedure of the main process of the NFA construction is explained with reference to FIG. 10. FIG. 10 is a flowchart of the procedure of the main process of the NFA construction performed by the NFA generating unit according to the present embodiment. In the process of FIG. 10, for example, an event pattern P is input, and N(P) that represents an NFA is output. Then, the node number is a variable i, while the @ number is a variable j. Here, the node number is assigned uniquely to each node, and it means the same as the state number. The state may be an initial state or a final state, depending on the node. The @ number corresponds to the reception time holding node (@ node).

First, the NFA generating unit 150b generates an initial state node having the node number 0, and enters a blank "@ list" in the generated node. Then, the NFA generating unit 150b sets the value of a current node number i to 0, and the current @ number j to 0 (S11). In the @ list, @ numbers are associated with time-out periods.

Then, the NFA generating unit 150b collects events that have no interval restriction anterior to the events from among the events indicated b the input pattern P (hereinafter, synonymous with "event reception restriction"), and forms a tentative set of events (tentative event set) (S12). An interval restriction means the same as an interval condition.

Then, the NFA generating unit 150b performs a subroutine process regarding an event reception restrictions collected in the tentative event set, by using the initial state node as a source node (S13).

Thereafter, when the subroutine process is completed, the NFA generating unit 150b generates a final-state node and assigns a value obtained by adding 1 to the current node number i to the generated node. Then, the NFA generating unit 150b connects each of the nodes included in the "end node list" to the generated final-state node by ∈_transition (S14). The "end node list" is a list of nodes at the endpoint and created through the subroutine process.

Then, the NFA generating unit 150b takes out a @ list from each node included in the end node list. Then, the NFA generating unit 150b uses a common @ number in the taken-out @ lists as a designated @ number, and enters the largest time-out as the time-out length into the final-state node (S15).

Procedure of Subroutine Process

Next, the subroutine process indicated at S13 of FIG. 10 is explained with reference to FIGS. 11A to 11C. FIGS. 11A to 11C are flowcharts of the procedure of the subroutine process.

The NFA generating unit 150b determines whether the source node is a node that is not in the initial state and whether there are two event reception restrictions or more that are collected in the tentative event set (S131). When the source node is a node in the initial-state, or when the source node is a node that is not in the initial state and there are less than two event reception restrictions collected in the tentative event set (no at S131), the NFA generating unit 150b proceeds to S132.

At S132, the NFA generating unit 150b generates a node for inputting an event that corresponds to each of the collected event reception restrictions (hereinafter, "event input node"). Then, the NFA generating unit 150b adds 1 to the current node number i and assigns the current node number i to the generated node. Then, the NFA generating unit 150b connects the source node to the generated event input node by ∈ transition. In other words, the NFA generating unit 150b adopts an ∈ transition for the connection between the source node and the event input node. Furthermore, the NFA generating unit 150b copies the @ list of the source node into the @ list of the generated node (S132).

On the other hand, when the source node is a node that is not in initial state and also when there are two event reception restrictions or more collected in the tentative event set (yes at S131), the NFA generating unit 150b proceeds to S133. In other words, the event reception restriction collected in the tentative event set indicates a branching pattern.

At S133, the NFA generating unit 150b assigns the current @ number j to the source node, and adds 1 to the @ number j (S133). In other words, this source node becomes a "reception time holding node" that holds the reception time of the event that serves as a branching point. Then, the NFA generating unit 150b sets the assigned @ number and the time-out 0 into the @ list of the source node (S134), and proceeds to S132.

After the processing of S132, the NFA generating unit 150b determines whether there is any unprocessed one of the event reception restrictions collected in the tentative event set (S135). If there is no unprocessed one in the collected event reception restrictions (no at S135), the NFA generating unit 150b terminates the subroutine process.

On the other hand, if there is an unprocessed one in the collected event reception restrictions (yes at S135), the NFA generating unit 150b takes the unprocessed event reception restriction out of the collected event reception restrictions (S136).

Then, the NFA generating unit 150b determines whether the current event reception restriction has an anterior interval restriction (S137). When there is no anterior interval restriction in the current event reception restriction (no at S137), the NFA generating unit 150b adds 1 to the current node number i, generates an event reception completion node, and assigns the current node number obtained from the addition to the generated node. Then, the NFA generating unit 150b effects a connection by an edge of the transition from the event input node to the event reception completion node upon receipt of a designated event. In other words, the NFA generating unit 150b determines the transition from the event input node to the event reception completion node as a "normal transition without any interval condition". In addition, the NFA generating unit 150b copies the @ list of the event input node into the @ list of the event reception completion node (S138). Thereafter, the NFA generating unit 150b proceeds to S141.

On the other hand, when the current event reception restriction includes an anterior interval restriction (yes at S137), the NFA generating unit 150b adds 1 to the current node number i, generates an event reception completion node, and assigns the current node number obtained through the addition to the generated node. Then, the NFA generating unit 150b establishes a connection by an edge of a transition from the event input node to the event reception completion node upon receipt of an event that satisfies the anterior interval restriction. In other words, the NFA generating unit 150b determines the transition from the event input node to the event reception completion node as a "normal transition with an interval condition". Moreover, the NFA generating unit 150b adds the anterior interval restriction to each time-out in the @ list of the event input node, and then copies it into the @ list of the generated event reception completion node (S139). Thereafter, the NFA generating unit 150b proceeds to S141.

Thereafter, the NFA generating unit 150b sets the number of anterior interval restrictions of the current event reception restriction to F (S141). Then, the NFA generating unit 150b determines whether the value of F is 2 or greater (S142). If F is not 2 or greater (no at S142), the NFA generating unit 150b determines the generated event reception completion node as a completion node (S143). Thereafter, the NFA generating unit 150b proceeds to S151 to perform the process with a posterior interval restriction of the current event reception restriction.

On the other hand, if the value of F is 2 or greater (yes at S142), the NFA generating unit 150b determines whether the number of event reception completion nodes generated corresponding to the current event reception restriction agrees with the value of F (S144). If the number of event reception completion nodes generated corresponding to the current event reception restriction does not agree with the value of F (no at S144), the NFA generating unit 150b proceeds to S135 to process an unprocessed one of the collected event reception restrictions.

On the other hand, when the number of event reception completion nodes generated corresponding to the current event reception restriction agrees with the value of F (yes at S144), the NFA generating unit 150b adds 1 to the current node number i, and generates a merging node corresponding to the current event reception restriction. Then, the NFA generating unit 150b connects all the event reception completion nodes generated corresponding to the current event reception restriction to the generated merging node by ∈_transition (S145). In other words, the NFA generating unit 150b determines the transition from the event reception completion nodes to the merging node as an "∈_transition".

Next, the NFA generating unit 150b assigns the current @ number j and the time-out 0 to all the event reception completion nodes generated corresponding to the current event reception restriction, and adds them to each of their @ lists. In other words, all the generated event reception completion nodes become "reception time holding nodes" that hold the reception times of the events. Moreover, the NFA generating unit 150b adds 1 to the @ number j (S146).

Next, the NFA generating unit 150b adopts, in the @ lists of the event reception completion nodes generated corresponding to the current event reception restriction, the @ number shared by the multiple event reception completion nodes that have been generated, for the designated @ number of the merging node. Then, the NFA generating unit 150b determines the largest one of the time-outs as the time-out length, and enters it in association with the merging node together with the @ number (S147).

Thereafter, the NFA generating unit 150b sets the @ numbers and the largest time-out of the @ numbers included in the @ lists of the event reception completion nodes generated corresponding to the current event reception restriction in such a manner as to avoid overlaps in the @ list of the merging node (S148). Then, the NFA generating unit 150b determines the merging node as the completion node (S149), and proceeds to S151 to process the posterior interval restrictions of the current event reception restriction.

At S151, the NFA generating unit 150b collects event reception restrictions that have posterior interval restrictions from the event reception restriction taken out at S136, and forms a tentative event set (S151). Then, the NFA generating unit 150b determines whether the number of event reception restrictions collected in the tentative event set is one or greater (S152). If the number of event reception restrictions collected in the tentative event set is not one or greater, or in other words if it is 0 (no at S152), the NFA generating unit 150b adds the completion node to the end node list (S153). Thereafter, the NFA generating unit 150b proceeds to S135 to perform processing onto an unprocessed one of the collected event reception restrictions.

On the other hand, if the number of collected event reception restrictions is one or greater (yes at S152), the NFA generating unit 150b recursively performs a subroutine process onto the event reception restrictions collected in the tentative event set by using the completion node as a source node (S154). Thereafter, the NFA generating unit 150b proceeds to S135 to perform processing onto an unprocessed one of the collected event reception restrictions.

Example of NFA Generating Process

Figure 11C:
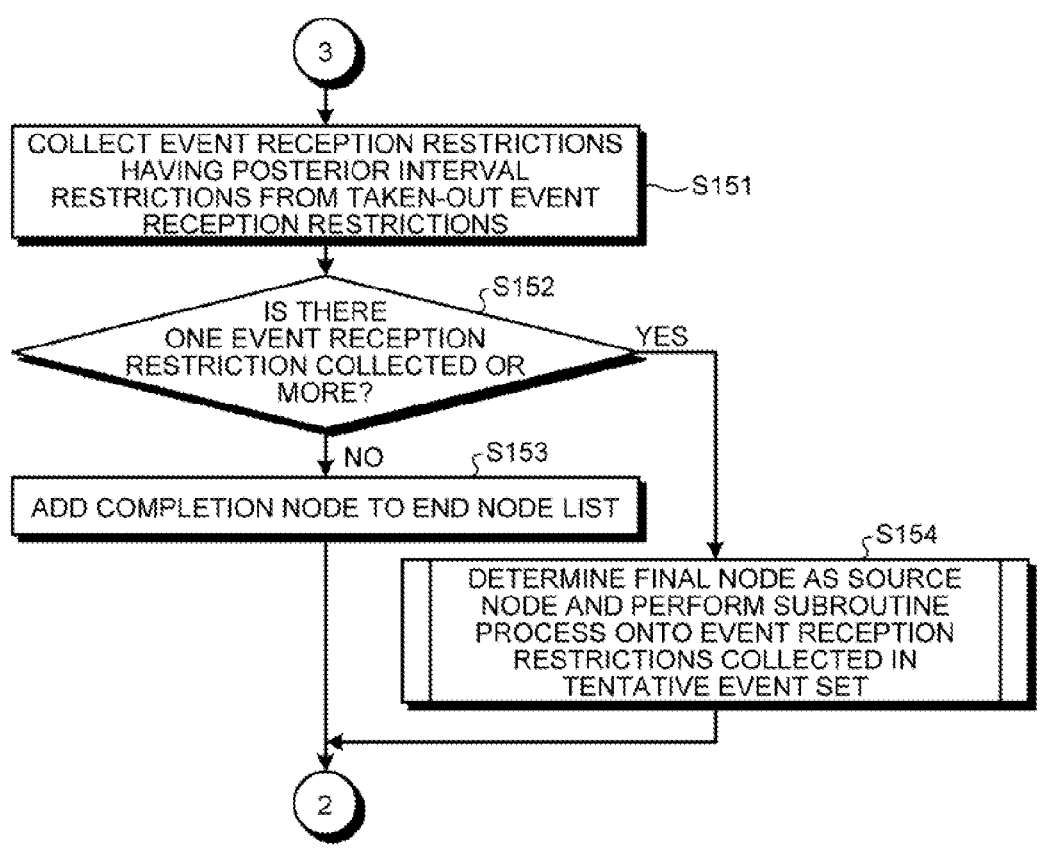
FIG. 11C is a flowchart of the procedure of the subroutine process of the NFA construction by the NFA generating unit.
Figure 12A:
FIG. 12A is a diagram for explaining a process of generating an NFA.
Figure 12B:
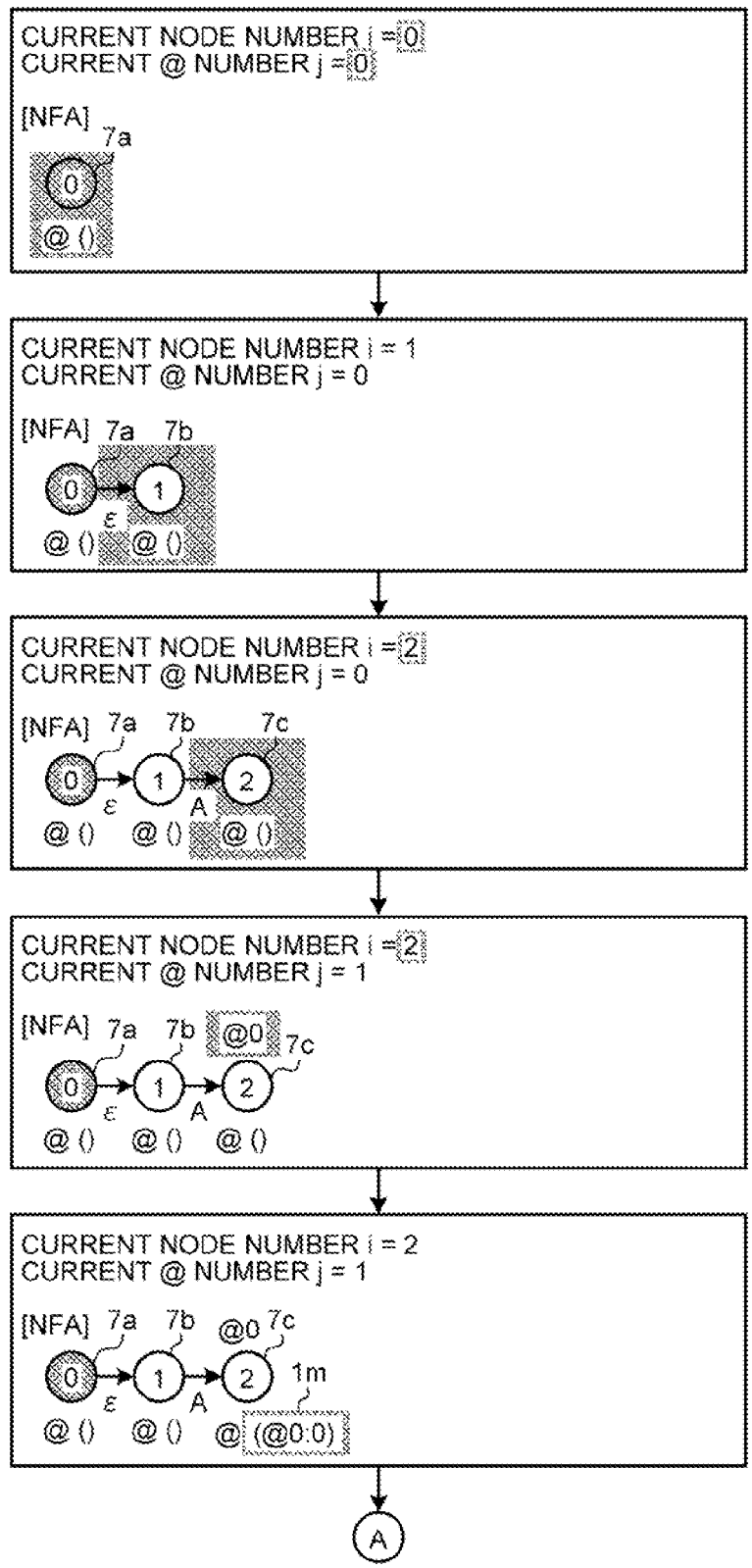
FIG. 12B is a diagram for explaining the process of generating the NFA.
Figure 12C:
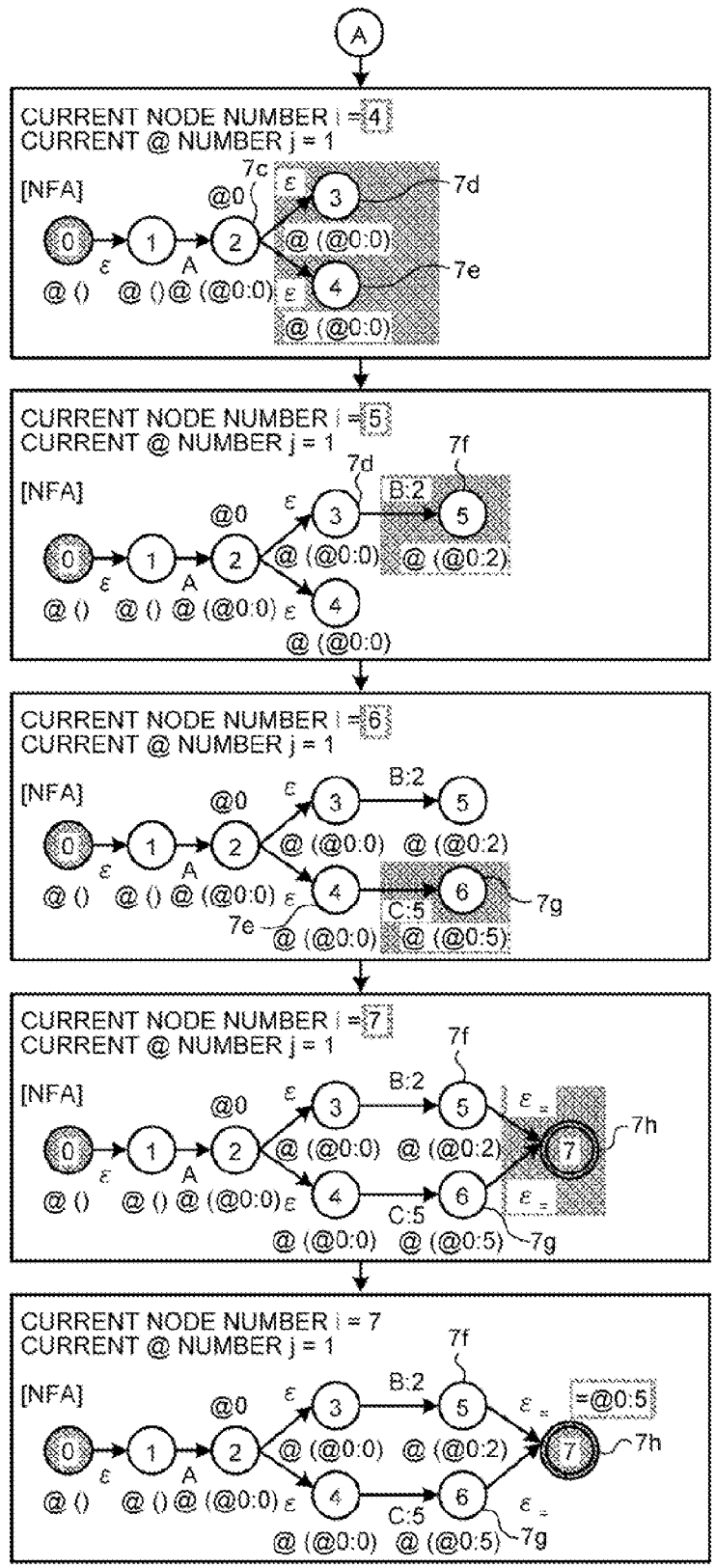
FIG. 12C is a diagram for explaining the process of generating the NFA.

Next, an explanation is provided regarding an example of the process with which the NFA generating unit 150b generates an NFAs 140b from the event patterns 140a by use of the NFA construction method indicated in FIGS. 10 to 11C when the event patterns 140a is a branching pattern. FIGS. 12A to 12C are diagrams for explaining the process of generating an NFA.

As illustrated in FIG. 12A, the data structure of an example of the event patterns 140a is represented as 202p. An event pattern in FIG. 12A has an event A that is the branching point, where the interval between the events A and B is 2 or smaller, and the interval between the events A and C is 5 or smaller.

As illustrated in the first stage of FIG. 12B, the NFA generating unit 150b generates a node 7a as an initial-state node having the node number 0, and enters a blank @ list in the generated node 7a. Then, the NFA generating unit 150b sets the value of the current node number i to 0, and the value of the current @ number j to 0. Thereafter, the NFA generating unit 150b collects ones that do not have anterior interval restrictions from the event reception restrictions indicated in the input event patterns 140a, and forms a tentative event set from them. Here, the NFA generating unit 150b forms a tentative event set with the event reception restrictions of the event A. The NFA generating unit 150b determines the node 7a as a source node.

As illustrated in the second stage of FIG. 12B, because the source node is the node 7a, the NFA generating unit 150b generates a node 7b as an event input node corresponding to the event reception restrictions (A) collected in the tentative event set. Then, the NFA generating unit 150b assigns to the generated node 7b the value 1 that is obtained by adding 1 to the current node number i. Thereafter, the NFA generating unit 150b connects the node 7a to the event input node 7b by ε transition.

As illustrated in the third stage of FIG. 12B, the NFA generating unit 150b takes an unprocessed one out of the event reception restrictions (A) collected in the tentative event set. Here, the NFA generating unit 150b takes the event A out. Then, the NFA generating unit 150b generates a node 7c as an event reception completion node, and assigns a value 2 obtained by adding 1 to the current node number i to the generated node 7c. Then, the NFA generating unit 150b establishes a connection by the edge of the node 7b transitioning to the node 7c upon receipt of the event A. In other words, the transition from the node 7b to the node 7c is determined as a "normal transition without an interval condition". Furthermore, the NFA generating unit 150b copies the @ list of the node 7b into the @ list of the node 7c.

Next, the NFA generating unit 150b sets the number of anterior interval restrictions of the current event reception restriction (A) to F. Here, because there is no anterior interval restriction with respect to the event A, the NFA generating unit 150b sets F to 0. In addition, because F is not greater than 2, the NFA generating unit 150b determines the node 7c as a completion node. Further, the NFA generating unit 150b collects the event reception restrictions having posterior interval restrictions with respect to the chosen event reception restriction (A), and forms a tentative event set. Here, because the interval restriction between the event A and the posterior event B is 2, and the interval restriction between the event A and the posterior event C is 5, the NFA generating unit 150b forms a tentative event set from the event reception restrictions B and C. Then, the NFA generating unit 150b determines the node 7c as a source node.

As illustrated in the fourth stage of FIG. 12B, because the node 7c is not an initial-state node, and also because the number of event reception restrictions (B and C) collected in the tentative event set is 2 or more, the NFA generating unit 150b assigns the value 0 of the current @ number j to the node 7c. In other words, the node 7c becomes a reception time holding node having a @ number 0 (@0). Then, the NFA generating unit 150b sets the value of the current @ number j to 1, which is obtained by adding 1 thereto.

As illustrated in the fifth stage of FIG. 12B, the NFA generating unit 150b sets the assigned @ number 0 and the time-out 0 into the @ list 1m of the node 7c.

As illustrated in the first stage of FIG. 12C, the NFA generating unit 150b generates nodes 7d and 7e as event input nodes corresponding to the event reception restrictions (B and C) collected in the tentative event set. Then, the NFA generating unit 150b assigns a value 3 that is obtained by adding 1 to the current node number i (2) to the generated node 7d, and a value 4 that is obtained by further adding 1 to the current node number i (3) to the generated node 7e. Then, the NFA generating unit 150b connects the node 7c to the node 7d by ε transition, and connects the node 7c to the node 7e by ε transition. Thereafter, the NFA generating unit 150b copies the @ list of the node 7c into each of the @ lists of the nodes 7d and 7e.

As illustrated in the second stage of FIG. 12C, the NFA generating unit 150b takes an unprocessed one out of the event reception restrictions (B and C) collected in the tentative event set. Here, the NFA generating unit 150b takes the event B out. Then, the NFA generating unit 150b generates a node 7f as an event reception completion node, and assigns the value 5 that is obtained by adding 1 to the current node number i to the generated node 7f. Then, the NFA generating unit 150b establishes a connection by an edge of the transition from the node 7d to the 7f upon receipt of the event B that satisfies an anterior interval restriction 2. In other words, the transition from the node 7d to the node 7f is a "normal transition with an interval condition". Furthermore, the NFA generating unit 150b adds the anterior interval restriction 2 to the time-out in the @ list of the node 7d and then copies it to the @ list of the event reception completion node 7f.

Thereafter, the NFA generating unit 150b sets the number of anterior interval restrictions with respect to the current event reception restriction (B) to F. Here, there is only an anterior interval restriction being 2 for the event B, and thus the NFA generating unit 150b sets the number F of anterior interval restrictions to 1. Then, because F is not greater than 2, the NFA generating unit 150b determines the node 7f as a completion node. Furthermore, the NFA generating unit 150b collects event reception restrictions that have posterior interval restrictions with respect to the chosen event reception restriction (B), and forms a tentative event set. Here, because there is no event reception restriction that has a posterior interval restriction with respect to the event B, the NFA generating unit 150b determines the tentative event set as an empty set. Then, because the tentative event set is empty, the NFA generating unit 150b adds the 7f to the end node list. Here, the processing of the event reception restriction B is completed.

As illustrated in the third stage of FIG. 12C, the NFA generating unit 150b takes an unprocessed one of the event reception restrictions (B and C) collected in the tentative event set. Here, because the processing of the event B is completed, the NFA generating unit 150b takes the unprocessed event C out. Then, the NFA generating unit 150b generates a node 7g as an event reception completion node, and assigns a value 6 obtained by adding 1 to the current node number i to the generated node 7g. Then, the NFA generating unit 150b establishes a connection by an edge of the transition from the node 7e to the node 7g upon receipt of the event C that satisfies an anterior interval restriction 5. In other words, the transition from the node 7e to the node 7g becomes a "normal transition with an interval condition". Furthermore, the NFA generating unit 150b adds the anterior interval restriction 5 to the time-out of the @ list of the node 7e and then copies it to the @ list of the node 7g.

Thereafter, because in the same manner as the event B, the current event reception restriction (C) has one anterior interval restriction and no posterior interval restriction, the NFA generating unit 150b adds the node 7g to the end node list. In other words, the end node list now includes the nodes 7f and 7g. The processing of the event reception restriction C is now completed. As a result, the processing of the event reception restriction A is completed.

Thereafter, because the processing of the event reception restrictions (B and C) in the tentative event set is completed, the NFA generating unit 150b turns them back to the original tentative event set and the original source node. In other words, the source node returns to the node 7a, and the tentative event set returns to the one that includes the event reception restriction A.

As illustrated in the fourth stage of FIG. 12C, because the processing of the event reception restriction A included in the original tentative event set is completed, the NFA generating unit 150b generates a node 7h as a final-state node, and assigns a value 7 that is obtained by adding 1 to the current node number i to the generated node 7h. Then, the NFA generating unit 150b connects each of the nodes 7f and 7g included in the end node list to the generated node 7h by ε_transition.

As illustrated in the fifth stage of FIG. 12C, the NFA generating unit 150b takes the @ list out of each of the nodes included in the end node list. Here, the NFA generating unit 150b takes the @ lists of the nodes 7f and 7g included in the end node list. Then, the NFA generating unit 150b enters a common @ number found in the taken-out @ lists as a designated @ number and the largest time-out as a time-out length into the node 7h. Here, the @ number 0 is associated with the time-out length 2 in @ list of the node 7f, and the @ number 0 is associated with the time-out length 5 in the @ list of the node 7g. For this reason, the NFA generating unit 150b enters 0 for the designated @ number and 5 for the time-out length into the node 7h.

As described above, the NFA generating unit 150b generates the NFAs 140b from the event patterns 140a of FIG. 12A by implementing the processes indicated in FIGS. 12A to 12C.

Another Example of NFA Generating Process

Next, an explanation is provided regarding another example of the process performed by the NFA generating unit 150b to generate the NFAs 140b from the event patterns 140a by use of the NFA construction method indicated in FIGS. 10 to 11C when the event patterns 140a are patterns including a branching pattern and a linking pattern. FIGS. 13A to 13E are diagrams for explaining the process of generating an NFA.

Figure 13A:
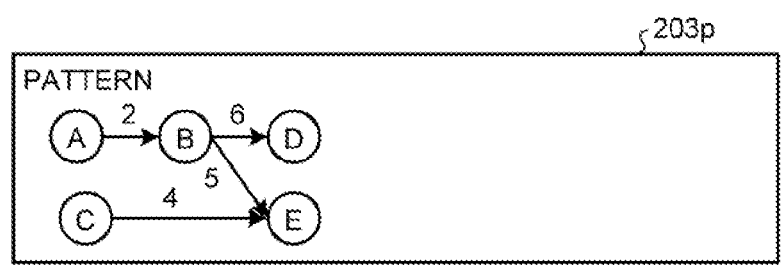
FIG. 13A is a diagram for explaining an NFA generating process by an NFA generating unit based on an event pattern.

As indicated in FIG. 13A, the data structure of the event patterns 140a is represented by 203p. The event patterns 140a have a noncontiguous serial pattern in which the interval between the events A and B is 2 or smaller. Then, the event patterns 140a include a branching pattern in which the event B is a branching point, the interval between the events B and D is 6 or smaller, and the interval between the events B and E is 5 or smaller. The event patterns 140a also include a linking pattern in which the interval between the events B and E is 5 or smaller, the interval between the events C and E is 4 or smaller, and the event E is the end of the linkage.

Figure 13B:
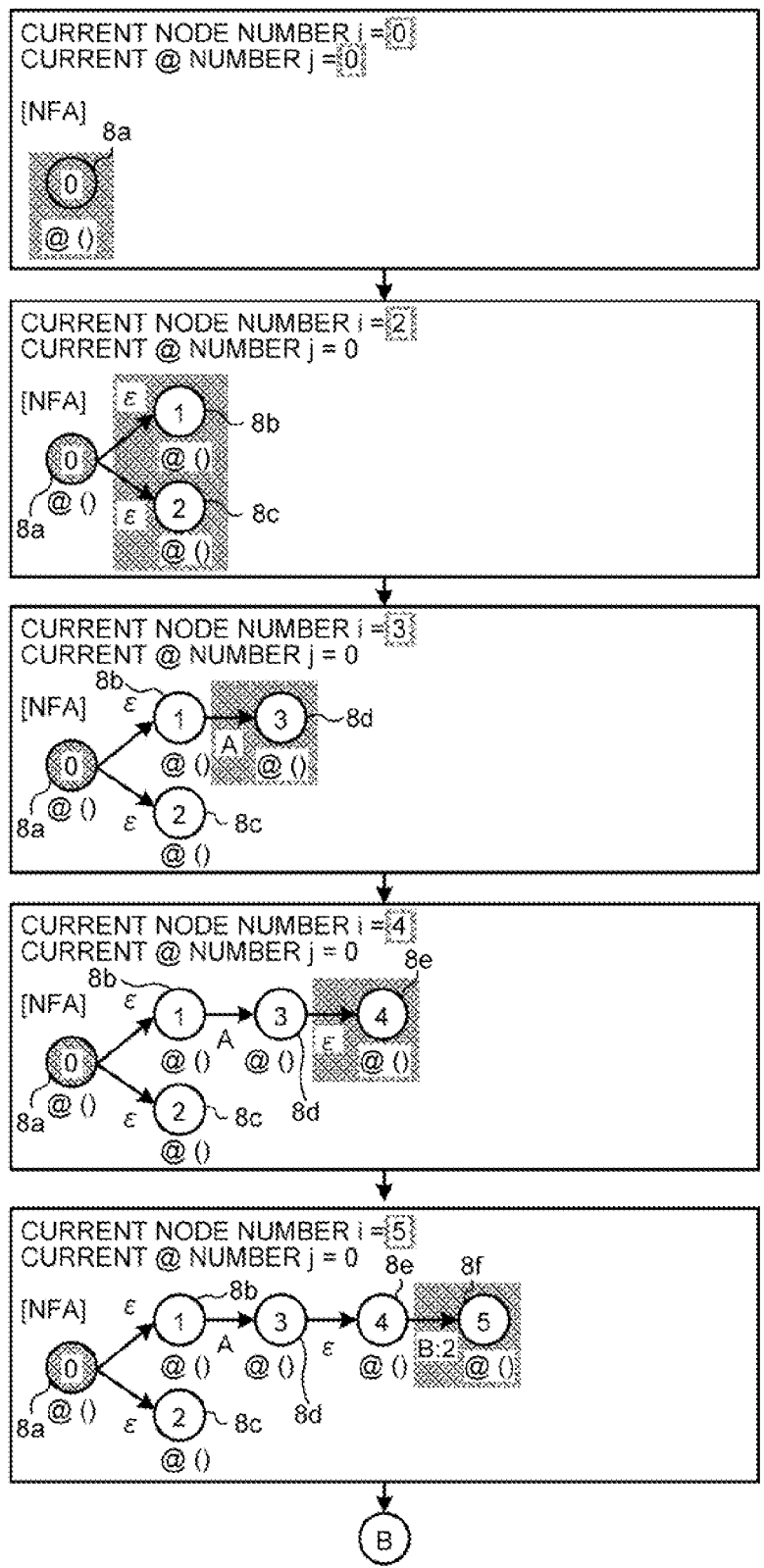
FIG. 13B is a diagram for explaining the NFA generating process by the NFA generating unit based on the event pattern.

As illustrated in the first stage of FIG. 13B, the NFA generating unit 150b generates a node 8a as an initial-state node having the node number 0, and enters a blank @ list into the generated node 8a. Then, the NFA generating unit 150b sets the value of the current node number i to 0 and the value of the current @ number j to 0. Then, the NFA generating unit 150b collects, from among the event reception restrictions indicated by the input event patterns 140a, ones that have no anterior interval restriction to form a tentative event set. Here, because A and C have no anterior interval restriction, the NFA generating unit 150b forms a tentative event set with the event reception restrictions A and C. Then, the NFA generating unit 150b determines the node 8a as a source node.

As illustrated in the second stage of FIG. 13B, because the source node is the node 8a, the NFA generating unit 150b generates nodes 8b and 8c as event input nodes that correspond to the event reception restrictions (A and C) collected in the tentative event set. Then, the NFA generating unit 150b adds 1 to the current node number i and assigns this value 1 obtained from the addition to the generated node 8b, while it adds 1 to the current node number i and assigns this value 2 obtained from the addition to the generated node 8c. Thereafter, the NFA generating unit 150b connects the node 8a to the node 8b by ε transition, and the node 8a to the node 8c by ε transition.

As illustrated in the third stage of FIG. 13B, the NFA generating unit 150b takes an unprocessed one out of the event reception restrictions (A and C) collected in the tentative event set. Here, the NFA generating unit 150*b* takes the event A out. Then, the NFA generating unit 150*b* generates a node 8*d* as an event reception completion node, and assigns a value 3 obtained by adding 1 to the current node number i to the generated node 8*d*. Thereafter, the NFA generating unit 150*b* establishes a connection by an edge of a transition from the event input node 8*b* to the node 8*d* upon receipt of the event A, and duplicates the @ list.

Next, because there is no anterior interval restriction in the current event reception restriction (A), the NFA generating unit 150*b* determines the node 8*d* as a completion node. Furthermore, the NFA generating unit 150*b* collects event reception restrictions that have posterior interval restrictions with respect to the event reception restriction (A) and forms a tentative event set. Here, because the interval restriction between the event A and the posterior event B is 2, the NFA generating unit 150*b* forms a tentative event set with the event reception restriction B. Then, the NFA generating unit 150*b* determines the node 8*d* as a source node.

As illustrated in the fourth stage of FIG. 13B, because the source node 8*d* is not an initial-state node, and also because the number of event reception restrictions (B) collected in the tentative event set is not 2 or greater, the NFA generating unit 150*b* performs the next process. That is, the NFA generating unit 150*b* generates a node 8*e* as an event input node that corresponds to the event reception restriction (B) collected in the tentative event set. Then, the NFA generating unit 150*b* assigns a value 4 obtained by adding 1 to the current node number i to the generated node 8*e*. Then, the NFA generating unit 150*b* connects the node 8*d* to the node 8*e* by ϵ transition.

As illustrated in the fifth stage of FIG. 13B, the NFA generating unit 150*b* takes an unprocessed one of the event reception restrictions (B) collected in the tentative event set. Here, the NFA generating unit 150*b* takes the event B out. Then, the NFA generating unit 150*b* generates a node 8*f* as an event reception completion node, and assigns a value 5 obtained by adding 1 to the current node number i to the generated node 8*f*. Then, the NFA generating unit 150*b* establishes a connection by an edge of the transition from the node 8*e* to the node 8*f* upon receipt of the event B that satisfies the anterior interval restriction 2. In other words, the transition from the node 8*e* to the node 8*f* becomes a "normal transition with an interval condition". Furthermore, the NFA generating unit 150*b* adds the anterior interval restriction 2 to the time-out of the @ list of the event input node 8*e* and then copies it into the @ list of the node 8*f*.

Thereafter, the number of anterior interval restrictions for the current event reception restriction (B) is not 2 or greater, the NFA generating unit 150*b* determines the node 8*f* as a completion node. Furthermore, the NFA generating unit 150*b* collects event reception restrictions that have posterior interval restrictions with respect to the taken-out event reception restriction (B), and thereby forms a tentative event set. Here, because the interval restriction between the event B and the posterior event D is 6 and the interval restriction between the event B and the event E is 5, the NFA generating unit 150*b* forms a tentative event set with the event reception restrictions D and E. Then, the NFA generating unit 150*b* determines the node 8*f* as a source node.

Figure 13C:
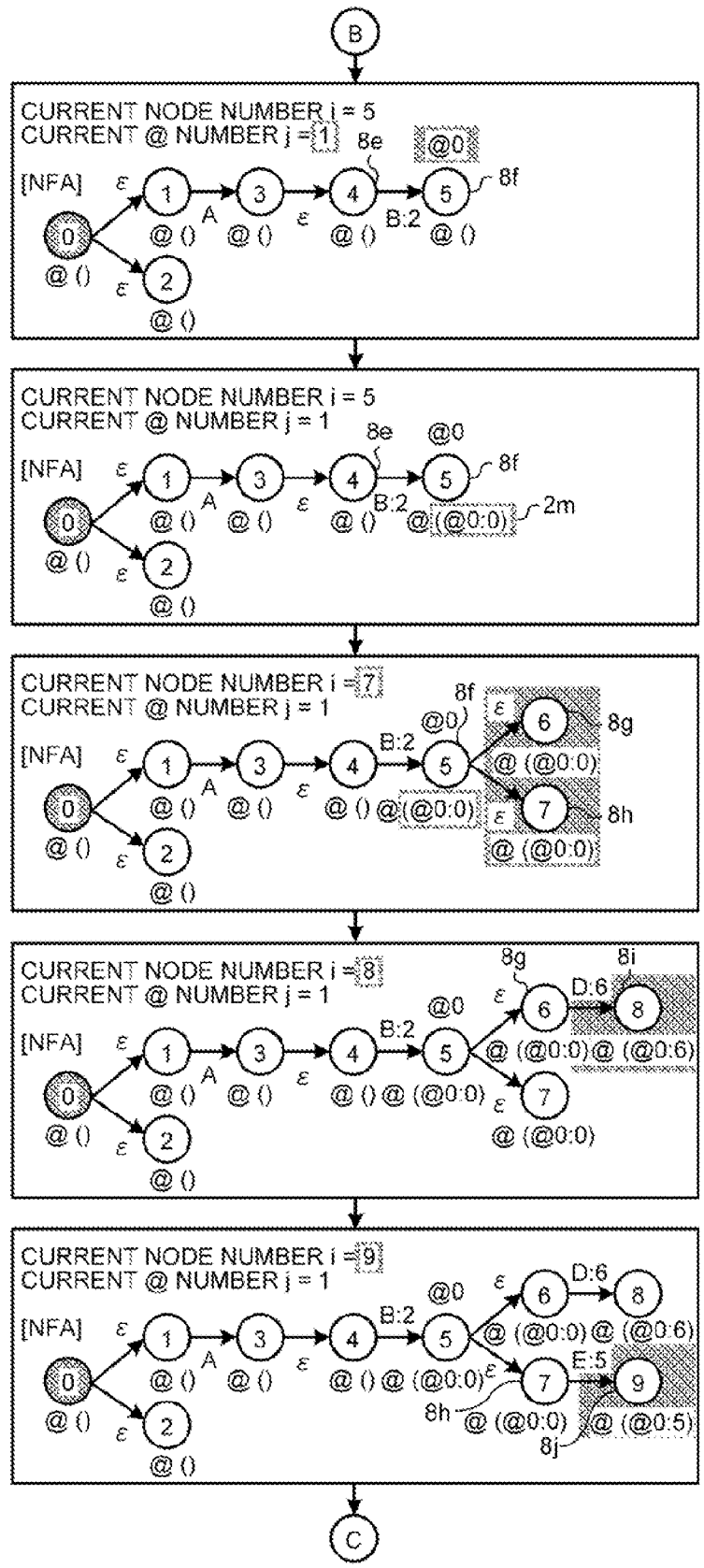
FIG. 13C is a diagram for explaining the NFA generating process by the NFA generating unit based on the event pattern.

As illustrated in the first stage of FIG. 13C, because the node 8*f* is not an initial-state node and also because the number of event reception restrictions collected in the tentative event set is 2 or more (D and E), the NFA generating unit 150*b* assigns a value 0, which is the current @ number j, to the node 8*f*. In other words, this node 8*f* becomes a reception time holding node having the @ number 0 (@0). Then, the NFA generating unit 150*b* sets the value of the current @ number j to a value 1 that is obtained by adding 1 thereto.

As illustrated in the second stage of FIG. 13C, the NFA generating unit 150*b* sets the assigned @ number 0 and the time-out 0 to a @ list 2*m* of the node 8*f*.

As illustrated in the third stage of FIG. 13C, the NFA generating unit 150*b* generates nodes 8*g* and 8*h* as event input nodes corresponding to the event reception restrictions (D and E) collected in the tentative event set. Then, the NFA generating unit 150*b* assigns a value 6 obtained by adding 1 to the current node number i (5) to the generated node 8*g*, and a value 7 obtained by further adding 1 to the current node number i (6) to the generated node 8*h*. Then, the NFA generating unit 150*b* connects the node 8*f* to the node 8*g* by ϵ transition, and the node 8*f* to the node 8*h* by ϵ transition. Then, the NFA generating unit 150*b* copies the @ list of the node 8*f* into the @ list of each of the nodes 8*g* and 8*h*.

As illustrated in the fourth stage of FIG. 13C, the NFA generating unit 150*b* takes the unprocessed event reception restriction D from the event reception restrictions (D and E) collected in the tentative event set. Then, the NFA generating unit 150*b* generates a node 8*i* as an event reception completion node, and assigns a value 8 obtained by adding 1 to the current node number i to the generated node 8*i*. Then, the NFA generating unit 150*b* establishes a connection by an edge of the transition from the node 8*g* to the node 8*i*, upon receipt of the event D that satisfies an anterior interval restriction 6. In other words, the transition from the node 8*g* to the node 8*i* becomes a "normal transition with an interval condition". Furthermore, the NFA generating unit 150*b* adds the anterior interval restriction 6 to the time-out of the @ list of the node 8*g* and copies it to the @ list of the node 8*i*.

Thereafter, because the number of anterior interval restrictions in the current event reception restriction (D) is not 2 or more, the NFA generating unit 150*b* determines the node 8*i* as a completion node. Moreover, the NFA generating unit 150*b* collects event reception restrictions that have posterior interval restrictions with respect to the taken-out event reception restriction (D), and thereby forms as a tentative event set. Here, because there is no event reception restriction having posterior interval restrictions with respect to the event D, the NFA generating unit 150*b* determines the tentative event set as an empty one. Then, because the tentative event set is empty, the NFA generating unit 150*b* adds the node 8*i* to the end node list. The processing of the event reception restriction D is now completed.

As illustrated in the fifth stage of FIG. 13C, the NFA generating unit 150*b* takes an unprocessed one out of the event reception restrictions (D and E) collected in the tentative event set. Here, because the processing of the event D is completed, the NFA generating unit 150*b* takes the unprocessed event E out. Then, the NFA generating unit 150*b* generates a node 8*j* as an event reception completion node, and assigns a value 9 obtained by adding 1 to the current node number i to the generated node 8*j*. Then, the NFA generating unit 150*b* establishes a connection by an edge of the transition from the node 8*h* to the node 8*j* upon receipt of the event E that satisfies the anterior interval restriction 5. In other words, the transition from the node 8*h* to the node 8*j* becomes a "normal transition with an interval condition". Furthermore, the NFA generating unit 150*b* adds the anterior interval restriction 5 to the time-out of the @ list of the node 8*h* and then copies it into the @ list of the node 8*j*. Here, the processing of the event reception restriction E is completed.

Next, the NFA generating unit 150*b* sets the number of anterior interval restrictions with respect to the current event reception restriction (E) to F. Here, because the anterior interval restrictions of the event E include the interval restriction of 5 between the events B and E and the interval restriction of 4 between the events C and E, the NFA generating unit 150*b* sets the number F of anterior interval restrictions to 2. Then, because F is 2 or more and because the generated event reception completion node corresponding to the current event reception restriction (E) is the node 8*j* only, the NFA generating unit 150*b* determines whether the event reception restrictions collected in the tentative event set include any unprocessed ones. Here, the processing of the event reception restrictions D, E, and B collected in the tentative event sets is completed, and therefore the NFA generating unit 150*b* turns them to the original tentative event set and the original source node. In other words, the source node is the node 8*a*, and the tentative event set includes the event reception restrictions A and C.

Figure 13D:
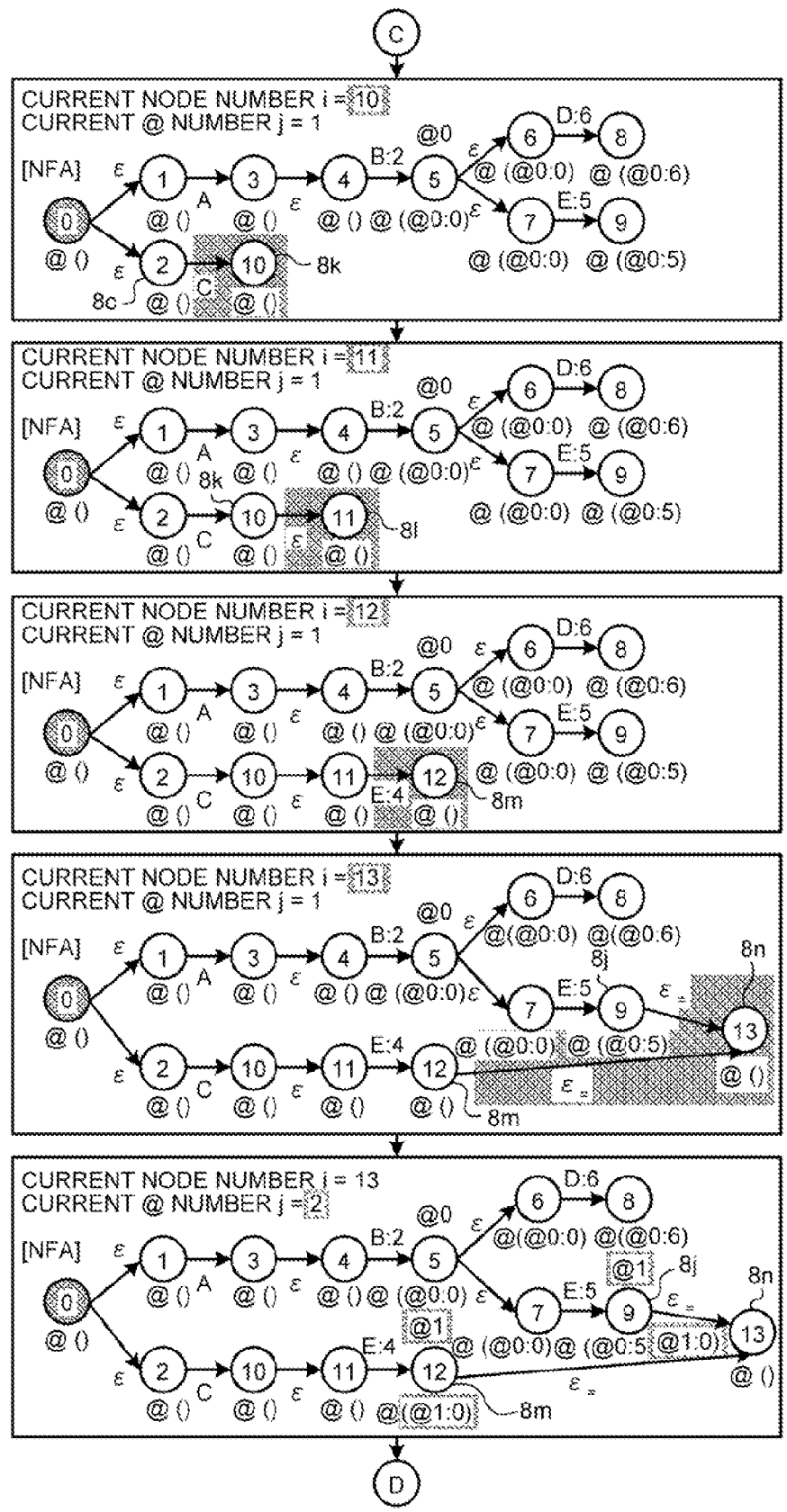
FIG. 13D is a diagram for explaining the NFA generating process by the NFA generating unit based on the event pattern.

As illustrated in the first stage of FIG. 13D, the NFA generating unit 150*b* takes an unprocessed one of the event reception restrictions (A and C) collected in the tentative event set. Here, because the processing of the event A is completed, the NFA generating unit 150*b* takes the event C out. Then, the NFA generating unit 150*b* generates a node 8*k* as an event reception completion node, and assigns a value 10 obtained by adding 1 to the current node number i to the generated node 8*k*. Then, the NFA generating unit 150*b* establishes a connection by an edge of the transition from the node 8*c* to the node 8*k* upon receipt of the event C, and duplicates the @ list.

Thereafter, because there is no anterior interval restriction with respect to the current event reception restriction (C), the NFA generating unit 150*b* determines the node 8*k* as a completion node. Moreover, the NFA generating unit 150*b* collects event reception restrictions having any posterior interval restrictions with respect to the taken-out event reception restriction (C), and thereby forms a tentative event set. Here, the NFA generating unit 150*b* forms a tentative event set with the event reception restriction E because the interval restriction between the event C and the posterior event E is 4. Then, the NFA generating unit 150*b* determines the node 8*k* as a source node.

As illustrated in the second stage of FIG. 13D, because the node 8*k* is not an initial-state node and also because the number of event reception restrictions (E) collected in the tentative event set is not 2 or more, the NFA generating unit 150*b* performs the next process. That is, the NFA generating unit 150*b* generates a node 8*l* as an event input node corresponding to the event reception restriction (E) collected in the tentative event set. Then, the NFA generating unit 150*b* assigns a value 11 that is obtained by adding 1 to the current node number i to the generated node 8*l*. Thereafter, the NFA generating unit 150*b* connects the node 8*k* to the node 8*l* by ε transition.

As illustrated in the third stage of FIG. 13D, the NFA generating unit 150*b* takes an unprocessed one of the event reception restrictions (E) collected in the tentative event set. Here, the NFA generating unit 150*b* takes the event E out. Then, the NFA generating unit 150*b* generates a node 8*m* as an event reception completion node, and assigns a value 12 obtained by adding 1 to the current node number i to the generated node 8*m*. Then, the NFA generating unit 150*b* establishes a connection by an edge of the transition from the node 8*l* to the node 8*m* upon receipt of the event E that satisfies the anterior interval restriction 4. In other words, the transition from the node 8*l* to the node 8*m* becomes a "normal transition with an interval condition". Moreover, the NFA generating unit 150*b* adds the anterior interval restriction 4 to the time-tout of the @ list of the node 8*l* and copies it into the @ list of the node 8*m*.

Thereafter, the NFA generating unit 150*b* sets the number of anterior interval restrictions with respect to the current event reception restriction (E) to F. Here, because the anterior interval restrictions of the event E include the interval restriction of 5 between the events B and E and the interval restriction of 4 between the events C and E, the NFA generating unit 150*b* sets the number F of anterior interval restrictions to 2.

As illustrated in the fourth stage of FIG. 13D, because F is 2 or more, and because there are two nodes 8*j* and 8*m* as event reception completion nodes which are generated to correspond to the current event reception restriction (E). Then, the NFA generating unit 150*b* generates a node 8*n* as a merging node corresponding to the event reception restriction (E). Then, the NFA generating unit 150*b* assigns a value 13 obtained by adding 1 to the current node number i to the generated node 8*n*. Then, the NFA generating unit 150*b* connects the nodes 8*j* and 8*m* to the node 8*n* by ε_transition.

As illustrated in the fifth stage of FIG. 13D, the NFA generating unit 150*b* assigns the current @ number j (1) and the time-out 0 to all the nodes 8*j* and 8*m* corresponding to the current event reception restriction (E), and adds them to their @ lists. In other words, these nodes 8*j* and 8*m* become reception time holding nodes having the @ number 1 (@1). Then, the NFA generating unit 150*b* sets the @ number j to 2, which is obtained by adding 1 to the @ number j.

Figure 13E:
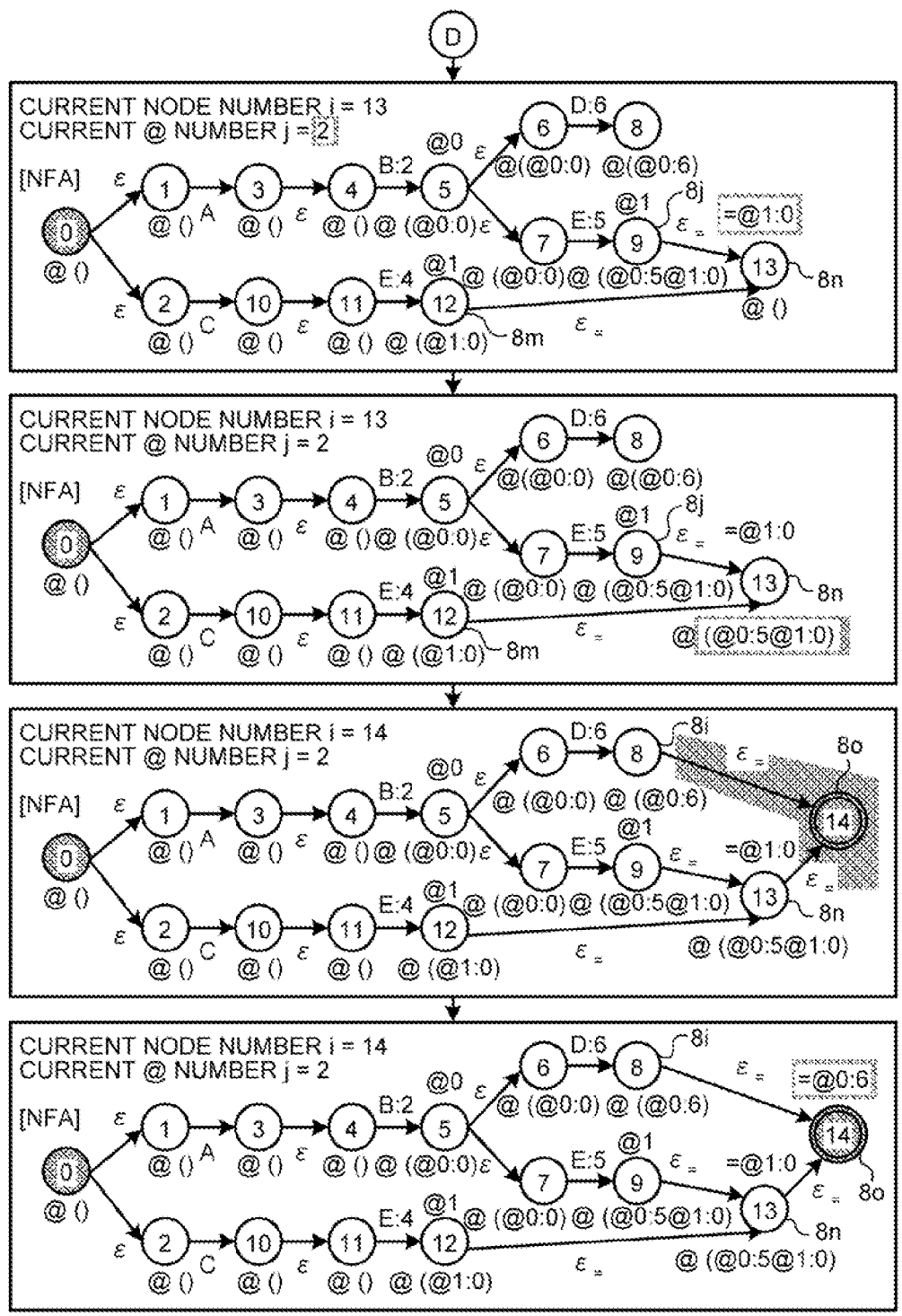
FIG. 13E is a diagram for explaining the NFA generating process by the NFA generating unit based on the event pattern.

As illustrated in the first stage of FIG. 13E, the NFA generating unit 150*b* determines the @ number shared by both @ lists of the nodes 8*j* and 8*m* that correspond to the current event reception restriction (E), as the designated @ number of the node 8*n*. Here, the @ numbers that the node 8*j* has are @0 and @1, while the @ number that the node 8*j* has is @1. Thus, the NFA generating unit 150*b* determines @1 as the designated @ number of the node 8*n*. Then, the NFA generating unit 150*b* enters the largest value of the time-outs (0 in this example) as the time-out length, together with the @ number @1 in association with the merging node.

As illustrated in the second stage of FIG. 13E, the NFA generating unit 150*b* sets the @ numbers included in the @ lists of the nodes 8*j* and 8*m* corresponding to the event reception restriction (E) and the largest time-out length of the @ numbers to the @ list of the node 8*n*. Here, the NFA generating unit 150*b* sets the @ number @0 and the time-out length 5 in association with each other, and the @ number @1 and the time-out length 0 in association with each other. Then, the NFA generating unit 150*b* determines the node 8*n* linking as a completion node.

Next, because there is no posterior interval restriction with respect to the current event reception restriction (E), the NFA generating unit 150*b* adds the link node 8*n*, which is a completion node, to the end node list. In other words, the end node list includes the nodes 8*i* and 8*n*. Here, the processing of the event reception restriction E is completed. As a result, the processing of the event reception restriction A is completed.

Thereafter, because the processing of the event reception restriction (E) collected in the tentative event set is completed, the NFA generating unit 150*b* turns the tentative event set and the source node back to the original ones. In other words, the source node returns to the node 8*a*, and the tentative event set returns to the event reception restrictions A and C.

As illustrated in the third stage of FIG. 13E, because the processing of the event reception restrictions A and C included in the tentative event set that is returned to the original is completed, the NFA generating unit 150*b* generates a node 8o as a final-state node and assigns a value 14 obtained by adding 1 to the current node number i to the generated node 80. Then, the NFA generating unit 150b connects each of the nodes 8i and 8n included in the end node list to the generated node 8o by $\epsilon$_transition.

As illustrated in the fourth stage of FIG. 13E, the NFA generating unit 150b takes the @ list out for each of the nodes included in the end node list. Here, the NFA generating unit 150b takes the @ lists of the nodes 8i and 8n included in the end node list. Then, the NFA generating unit 150b enters a common @ number in the taken-out @ lists as a designated @ number, and the largest time-out as a time-out length, into the node 80. Here, the @ number 0 and the time-out length 6 are associated with each other in the @ list of the node 8i. Furthermore, the @ number 0 and the time-out length 5 are associated with each other, and the @ number 1 and the time-out length 0 are associated with each other in the @ list of the node 8n. Thus, the NFA generating unit 150b enters the designated @ number being 0 and the time-out length being 6 in the node 80.

As described above, the NFA generating unit 150b generates the NFAs 140b from the event patterns 140a of FIG. 13A by executing the processes of FIGS. 13A to 13E.

Figure 14:
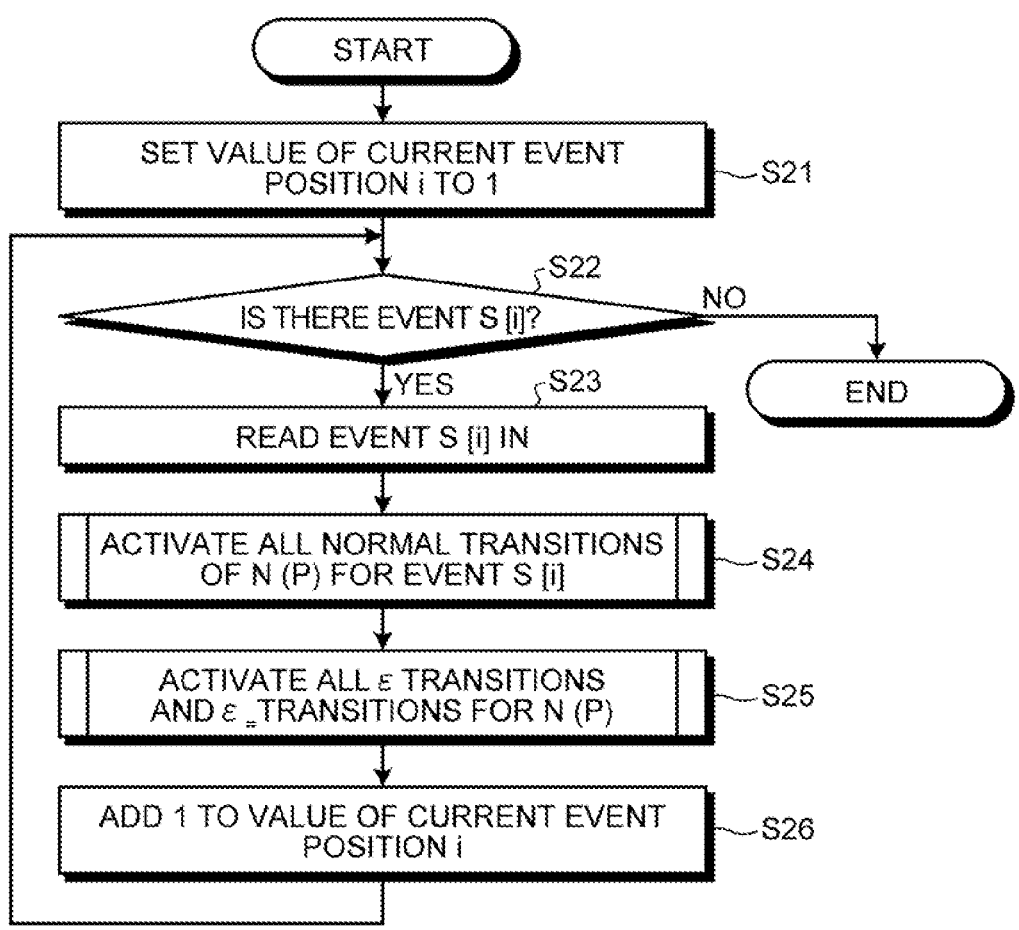
FIG. 14 is a flowchart of a procedure of a main pattern matching process performed by a matching unit.
Figure 15:
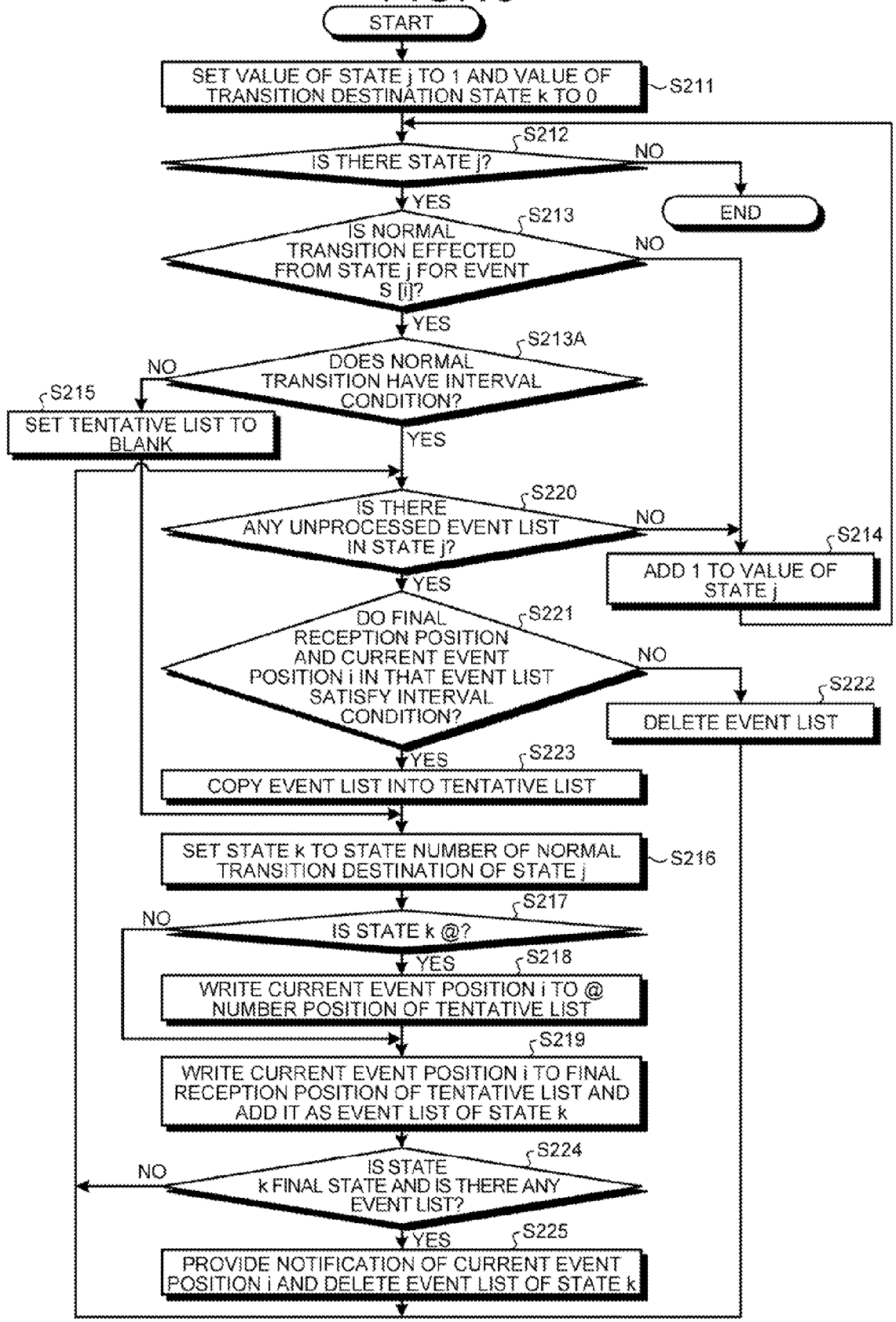
FIG. 15 is a flowchart of a procedure of a normal transition activating process.
Figure 16:
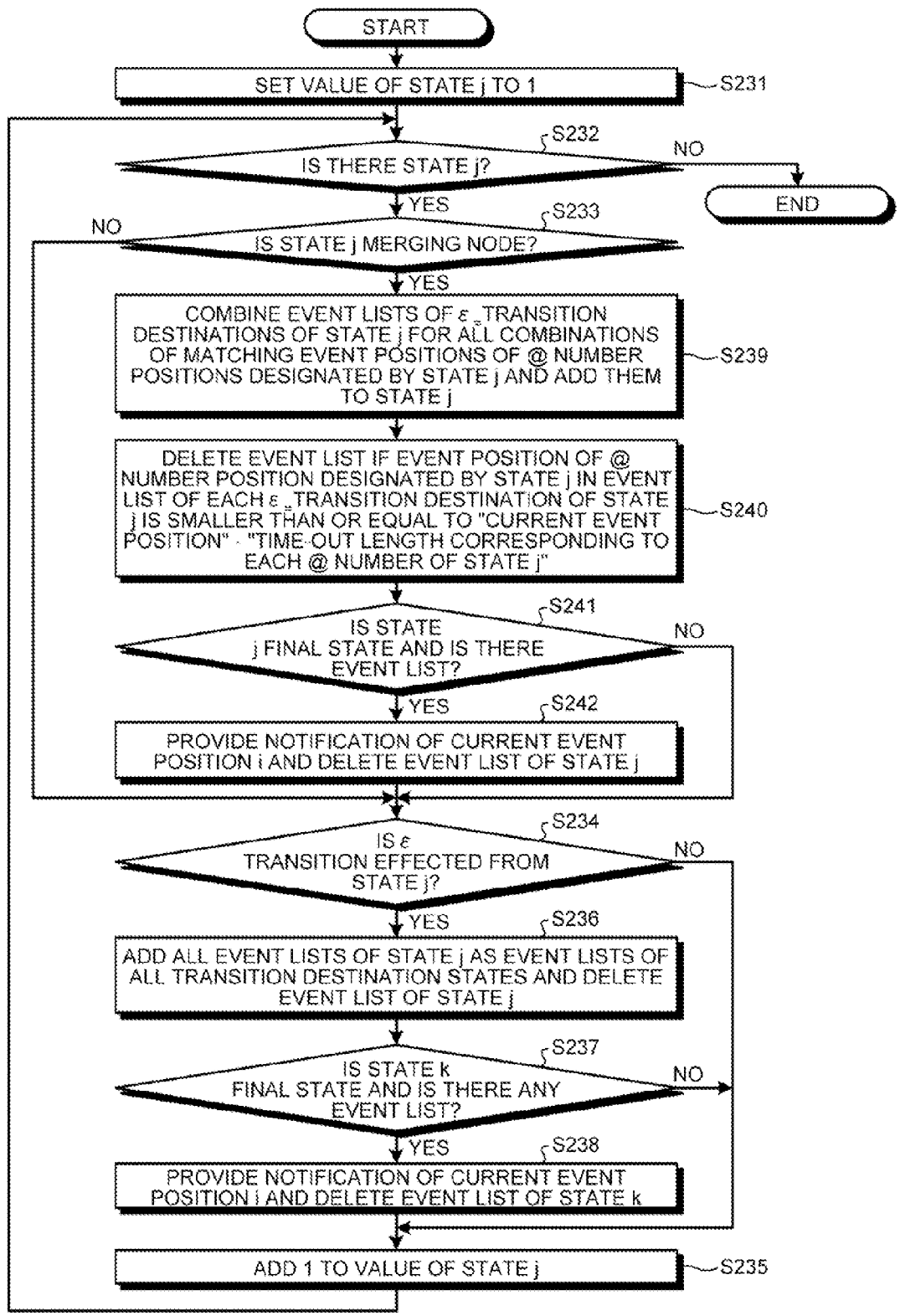
FIG. 16 is a flowchart of a procedure of a process of activating all $\epsilon$ transitions and $\epsilon\_$transitions.

Procedure of Pattern Matching Process by Matching Unit According to Present Embodiment Next, the procedure of the pattern matching process performed by the matching unit 150c according to the present embodiment is explained with reference to FIGS. 14 to 16. The procedure of the pattern matching main process performed by the matching unit is illustrated in FIG. 14, the procedure of the normal transition activating process is illustrated in FIG. 15, and the procedure of the process of activating all the $\epsilon$ transitions and $\epsilon$_transitions is illustrated in FIG. 16.

Procedure of Pattern Matching Main Process

First, the process of the pattern matching main process is explained with reference to FIG. 14. FIG. 14 is a flowchart of the procedure of the pattern matching main process performed by the matching unit according to the present embodiment. For example, the process of FIG. 14 is executed after the event patterns 140a and the event streams 140c are acquired, in response to the generation of the NFAs 140b.

First, the matching unit 150c sets the current event position i to 1 (S21). Then, the matching unit 150c determines whether the event S[i] is present (S22). Here, the event S[i] corresponds to the current event position i of the event streams 140c, or in other words, to the event of the time i.

If there is no event S[i] (no at S22), the matching unit 150c terminates the main process. On the other hand, if there is an event S[i] (yes at S22), the matching unit 150c reads the event S[i] from the event streams 140c (S23).

Thereafter, the matching unit 150c activates all the normal transitions of an NFA (N(P)) related to the read-in event S[i] (S24). Here, the NFA (N(P)) corresponds to the NFAs 140b.

Moreover, the matching unit 150c activates all the $\epsilon$ transitions and $\epsilon$_transitions of the NFA (N(P)) (S25). Then, the matching unit 150c adds 1 to the value of the current event position i (S26), and proceeds to step S22.

Procedure of Process of Activating Normal Transitions

Next, the process of activating normal transitions indicated at S24 of FIG. 14 is explained with reference to FIG. 15. FIG. 15 is a flowchart of the procedure of the process of activating normal transitions.

As indicated in FIG. 15, the matching unit 150c sets the value of a state j to 1 and the value of a transition destination state k to 0 (S211). Here, the state j corresponds to the node number of the NFA(N(P)), or in other words, the state number thereof. Further, the transition destination state k corresponds to the node number of the transition destination, or in other words, the state number thereof.

Then, the matching unit 150c determines whether there is a state j (S212), and terminates the process if there is no state j (no at S212). On the other hand, when there is a state j (yes at S212), the matching unit 150c determines whether a normal transition for the event S[i] is effected from the state j (S213). If there is no normal transition (no at S213), the matching unit 150c adds 1 to the value of the state j (S214), and proceeds to S212.

On the other hand, if there is a normal transition (yes at S213), the matching unit 150c determines whether it is a normal transition with an interval condition (S213A). If it is not a normal transition with an interval condition (no at S213A), the matching unit 150c sets a tentative list to a blank one (S215). Here, the tentative list is temporarily used to generate an event list, and has the same structure as the event list. Moreover, an event list is brought into association with each node that receives an event, and the reception state of the event is set in the event list. For the reception state, an @ number position and a final reception position, for example, are associated with each other. The @ number position indicates a region for writing the position of an event received by a node for reception time holding to which the @ number is assigned. Moreover, the final reception position indicates a region for writing the position of the event that is finally received at the current moment.

Then, the matching unit 150c sets the state number of the normal transition destination of the state j to the state k (S216). Then, the matching unit 150c determines whether the @ number is assigned to the state k (S217). In other words, the matching unit 150c determines whether the node corresponding to the node number of the state k is a reception time holding node. When the @ number is assigned to the state k (yes at S217), the matching unit 150c writes the current event position i to the @ number position of the tentative list (S218), and proceeds to S219. Then, the matching unit 150c writes the current event position i to the final reception position of the tentative list, and adds it as an event list of the state k (S219). Thereafter, the matching unit 150c proceeds to S224.

On the other hand, when it is a normal transition with an interval condition (yes at S213A), the matching unit 150c determines whether there is any unprocessed event list in the state j (S220). If there is an unprocessed event list in the state j (yes at S220), the matching unit 150c selects an unprocessed event list, and determines whether the final reception position of the selected event list and the current event position i satisfy the interval condition (S221). Then, if the interval condition is not satisfied (no at S221), the matching unit 150c deletes the selected event list (S222), and proceeds to S220 to continue the process for the state j. On the other hand, if the interval condition is satisfied (yes at S221), the matching unit 150c copies the selected event list into the tentative list (S223), and proceeds to S216.

In other words, the matching unit 150c sets the state number of the normal transition destination of the state j to the state k. Then, if the @ number is assigned to the state k, the matching unit 150c writes the current event position i over the @ number position of the tentative list and the current event position i over the final reception position of the tentative list, and adds them as the event list of the state k. On the other hand, if the @ number is not assigned to the state k, the matching unit 150c writes the current event position i over the final reception position of the tentative list, adds it as the event list of the state k.

Thereafter, the matching unit 150c determines whether the state k is a final state and also whether there is any event list (S224). If the state k is a final state and there is an event list (yes at S224), the matching unit 150c provide notification of the current event position i, and deletes the event list of the state k (S225). In other words, the matching unit 150c provides notification of the event position i as the completion time of the event pattern. Then, the matching unit 150c proceeds to S220 to continue the processing of the state j. On the other hand, when the state k is not a final state, or when there is no event list (no at S224), the matching unit 150c proceeds to S220 to continue the processing of the state j.

Procedure of Process of Activating All $\epsilon$ Transitions and $\epsilon$_Transitions Next, the process of activating all the $\epsilon$ transitions and $\epsilon$_transitions indicated at S25 of FIG. 14 is explained with reference to FIG. 16. FIG. 16 is a flowchart of the procedure of the process of activating all the $\epsilon$ transitions and $\epsilon$_transitions.

As indicated in FIG. 16, the matching unit 150c sets the value of the state j to 1 (S231). Then, the matching unit 150c determines whether there is a state j (S232). When there is no state j (no at S232), the matching unit 150c terminates the process.

On the other hand, when there is a state j (yes at S232), the matching unit 150c determines whether the state j is a merging node (S233). When the state j is not a merging node (no at S233), the matching unit 150c determines whether an $\epsilon$ transition is effected from the state j (S234). When there is no $\epsilon$ transition from the state j (no at S234), the matching unit 150c adds 1 to the value of the state j (S235), and proceeds to S232. On the other hand, when there is an $\epsilon$ transition from the state j (yes at S234), the matching unit 150c adds all the event lists of the state j as event lists of the states of all the transition destinations, and deletes the event lists of the state j (S236).

Thereafter, the matching unit 150c determines whether the state k is a final state, and also whether there is any event list (S237). When the state k is a final state and there is an event list (yes at S237), the matching unit 150c provides notification of the current event position i as a matching result, and deletes the event list of the state k (S238). In other words, the matching unit 150c provides notification of the completion time of the event pattern as a result of the matching completed. Then, the matching unit 150c proceeds to S235 to continue the process of the state j. On the other hand, when the state k is not a final state, or when there is no event list (no at S237), the matching unit 150c proceeds to S235 to continue the process of the state j.

On the other hand, when the state j is a merging node (yes at S233), the matching unit 150c searches for event lists of the $\epsilon$_transition sources of the state j in which the event positions of the @ number positions of the designated @ number designated by the state j agree with each other. Then, as a result of the search, the matching unit 150c combines the event lists having the same event positions of the @ number positions in any combinations, and adds the combined event list to the state j (S239).

Thereafter, the matching unit 150c takes the event position of the @ number position of the @ number designated by the state j from the event list of each $\epsilon$_transition source of the state j. Then, when the taken-out event position is smaller than or equal to {"the current event position"–"the time-out length corresponding to each @ number of the state j"}, the matching unit 150c determines that it is a time-out, and deletes this event list (S240).

Then, the matching unit 150c determines whether the state j is a final state and whether there is any event list (S241).

When the state j is a final state and when there is an event list (yes at S241), the matching unit 150c provides notification of the current event position i as a matching result, and deletes the event list of the state j (S242). In other words, the matching unit 150c provides notification of the end time of the event pattern, as a result of completing the matching. Then, the matching unit 150c proceeds to S234 to continue the process of the state j. On the other hand, when the state j is not a final state, or when there is no event list (no at S241), the matching unit 150c proceeds to S234 to continue the process of the state j.

Example of Pattern Matching Process

Next, the process performed by the matching unit 150c is explained. FIGS. 17A to 17K are diagrams for explaining the process performed by the matching unit. In the explanation of FIGS. 17A to 17K, nodes are differentiated in accordance with the state numbers. Hereinafter, the nodes of the state numbers 1 to 14 are referred to as the states 1 to 14, respectively. In addition, an example of the event streams 140c that is compared with the NFAs 140b is illustrated in FIG. 3, with the events held in S[i] (i=1 to 10).

Figure 17A:
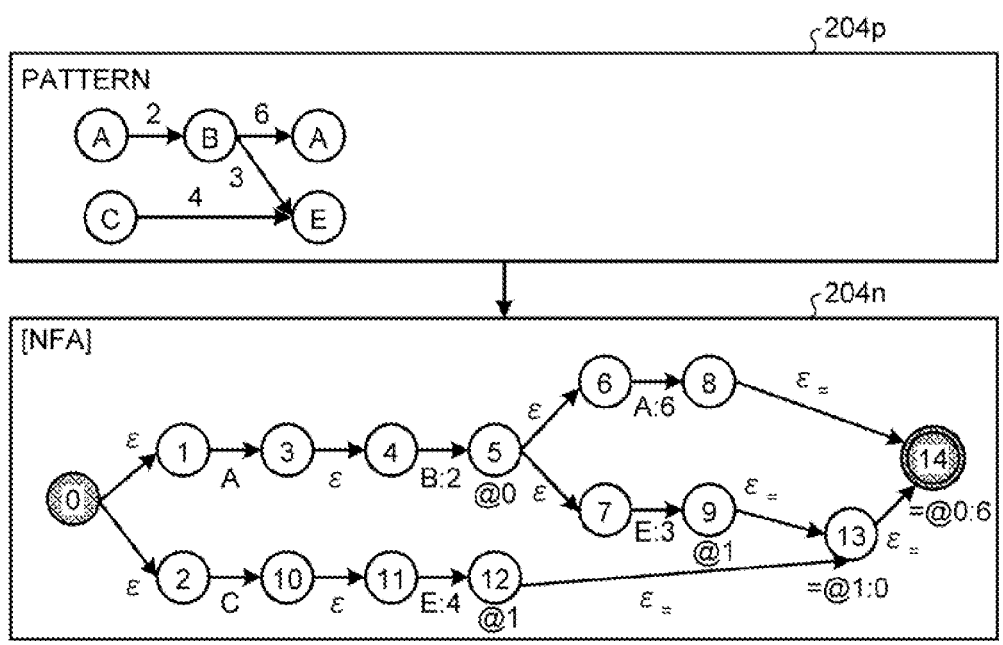
FIG. 17A is a diagram for explaining a process performed by a matching unit.

As illustrated in FIG. 17A, the data structure of the event patterns 140a is indicated by the reference numeral 204p. The event patterns 140a have a noncontiguous serial pattern having an interval between the events A and B being 2 or smaller. Then, the event patterns 140a include a branching pattern in which the event B serves as a branching point, the interval between the events B and A is 6 or smaller, and the interval between the events B and E is 3 or smaller. The event patterns 140a also include a linking pattern in which the interval between the events B and E is 3 or smaller, the interval between the events C and E is 4 or smaller, and the event E serves as the linkage end. The NFA generated by the NFA generating unit 150b when this event patterns 140a are input is represented by 204n.

Figure 17B:
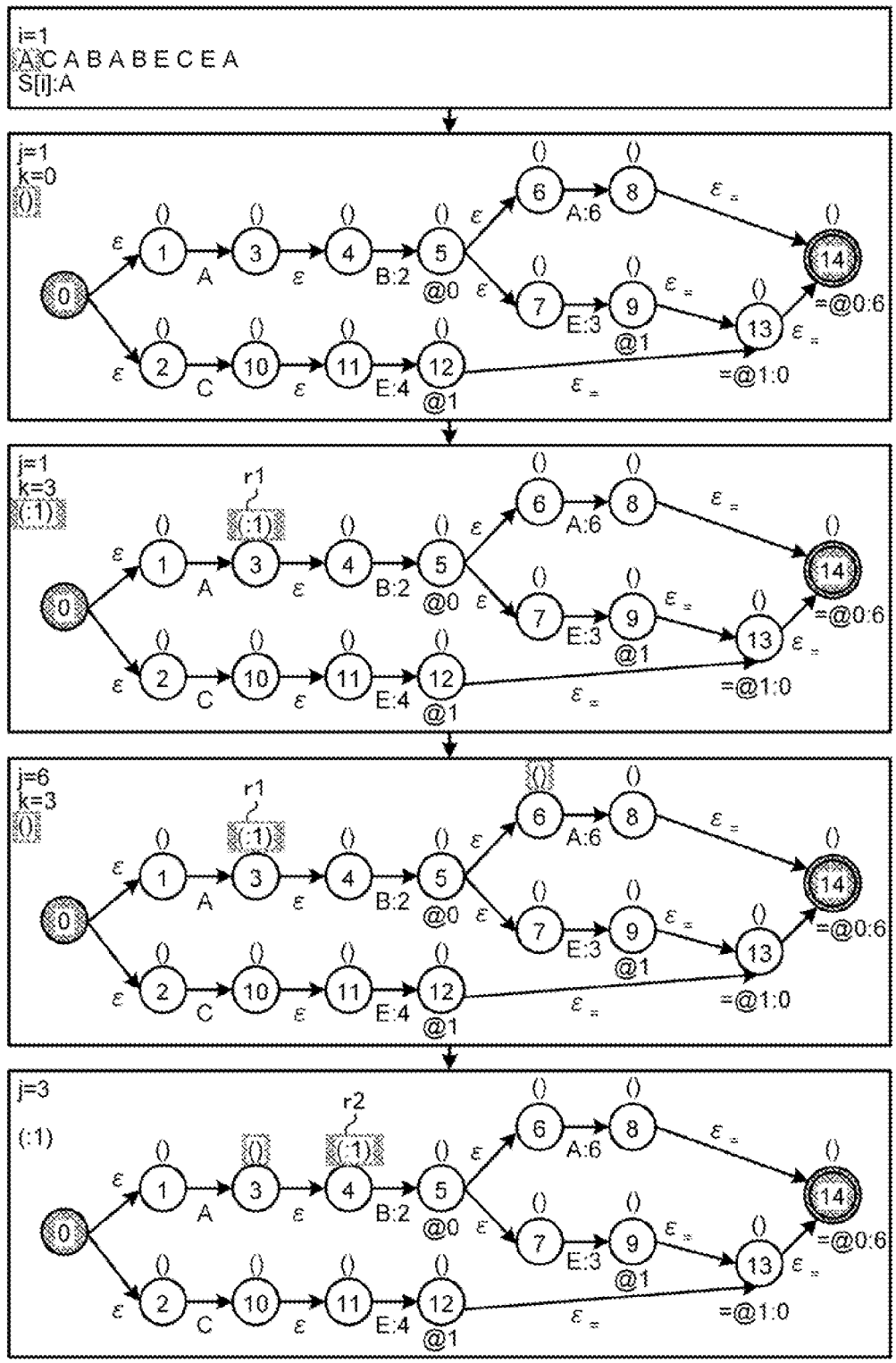
FIG. 17B is a diagram for explaining the process performed by the matching unit.

As illustrated in the first stage of FIG. 17B, the matching unit 150c sets the value of the current event position i to 1, and reads the event S[1] at an event position 1, or in other words, an event "A", from the event streams 140c. In other words, the matching unit 150c reads the event "A" of the time 1.

As illustrated in the second stage of FIG. 17B, the matching unit 150c initializes the value of the state j and the value of the transition destination state k, and sets the value of the state j to 1 and the value of the transition destination state k to 0. The matching unit 150c increments the value of the state j by 1, and determines whether a normal transition for the event "A" is effected from the state j. Here, because a normal transition with no interval condition for the event "A" is effected from the state 1, the matching unit 150c sets the tentative list for setting the event reception state to a blank list. Then, the matching unit 150c sets the state k to the state 3 that is the normal transition destination of the state 1.

As illustrated in the third stage of FIG. 17B, because the @ number is not assigned to the state 3, the matching unit 150c sets the current event position 1 to the final reception position of the tentative list, and adds the set-up tentative list as the event list 1r of the state 3. Then, because no normal transition is effected for the event "A" from any of the states 2 to 5, the matching unit 150c increments the value of the state j by 1, and sets it to 5.

As illustrated in the fourth stage of FIG. 17B, a normal transition with an interval condition for the event "A" is effected from the state 6, which is obtained by incrementing the value of the state j by 1, but there is no unprocessed event list in the state 6 and therefore there is no target to compare regarding the interval condition. Thus, the matching unit 150c continues the processing.

Thereafter, because no normal transition for the event "A" is effected from the states 7 to 14, the matching unit 150c terminates the activation of all the normal transitions for the event "A" at the current event position 1 (time 1).

As illustrated in the fifth stage of FIG. 17B, the matching unit 150c executes the activation of all the $\epsilon$ transitions and the $\epsilon$_transitions effected from the state j, as incrementing the value of the state j by 1. Because an $\epsilon$ transition is effected from the state 3, the matching unit 150c adds the event list r1 of the state 3 as the event list r2 of the transition destination state 4, and deletes the event list r1 of the state 3. Then, when the processing is completed for up to the state 14, the matching unit 150c terminates the activation of all the $\epsilon$ transitions and $\epsilon$_transitions.

Figure 17C:
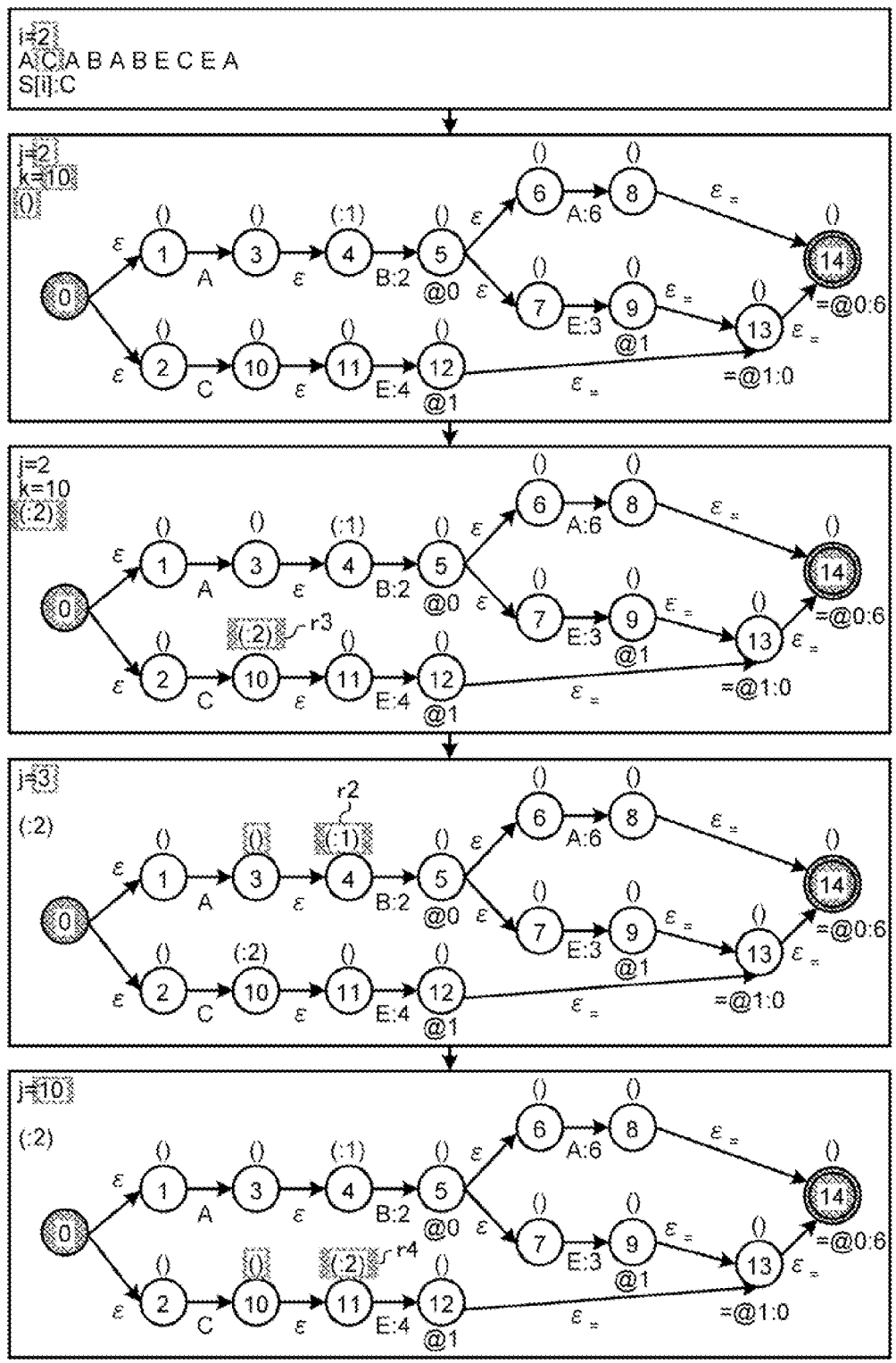
FIG. 17C is a diagram for explaining the process performed by the matching unit.

As illustrated in the first stage of FIG. 17C, the matching unit 150c sets the value of the current event position i to 2, and reads the event S[2] of the event position 1, in other words the event "C", from the event streams 140c. That is, the matching unit 150c reads the event "C" of the time 2.

As illustrated in the second stage of FIG. 17C, the matching unit 150c initializes the value of the state j and the value of the transition destination state k, and sets the value of the state j to 1 and the value of the transition destination state k to 0. The matching unit 150c increments the value of the state j by 1 and determines whether a normal transition for the event "C" is effected from the state j. Here, because a normal transition without an interval condition for the event "C" is effected from the state 2, the matching unit 150c sets the tentative list to a blank one. Then, the matching unit 150c sets the state 10, which is a normal transition destination of the state 2, to the state k.

As illustrated in the third stage of FIG. 17C, because the @ number is not assigned to the state 10, the matching unit 150c sets the current event position 2 to the final reception position of the tentative list, and adds the set-up tentative list as the event list r3 of the state 10. Then, because no normal transition is effected from the states 3 to 14 for the event "C", the matching unit 150c terminates the activation of all the normal transitions for the event "C" at the current event position 2 (time 2).

As illustrated in the fourth stage of FIG. 17C, the matching unit 150c executes the activation of all the $\epsilon$ transitions and $\epsilon$_transitions from the state j, while incrementing the value of the state j by 1. An $\epsilon$ transition is effected from the state 3, but the event list of the state 3 is originally blank. Thus, the matching unit 150c does not make any change to the event list of the state 3.

As illustrated in the fifth stage of FIG. 17C, the matching unit 150c activates the $\epsilon$ transition from the state 10, adds the event list r3 of the state 10 as the event list r4 of the transition destination state 11, and deletes the event list r3 of the state 10. When the process is completed for up to the state 14, the matching unit 150c terminates all the activation of the $\epsilon$ transitions and $\epsilon$_transitions.

Figure 17D:
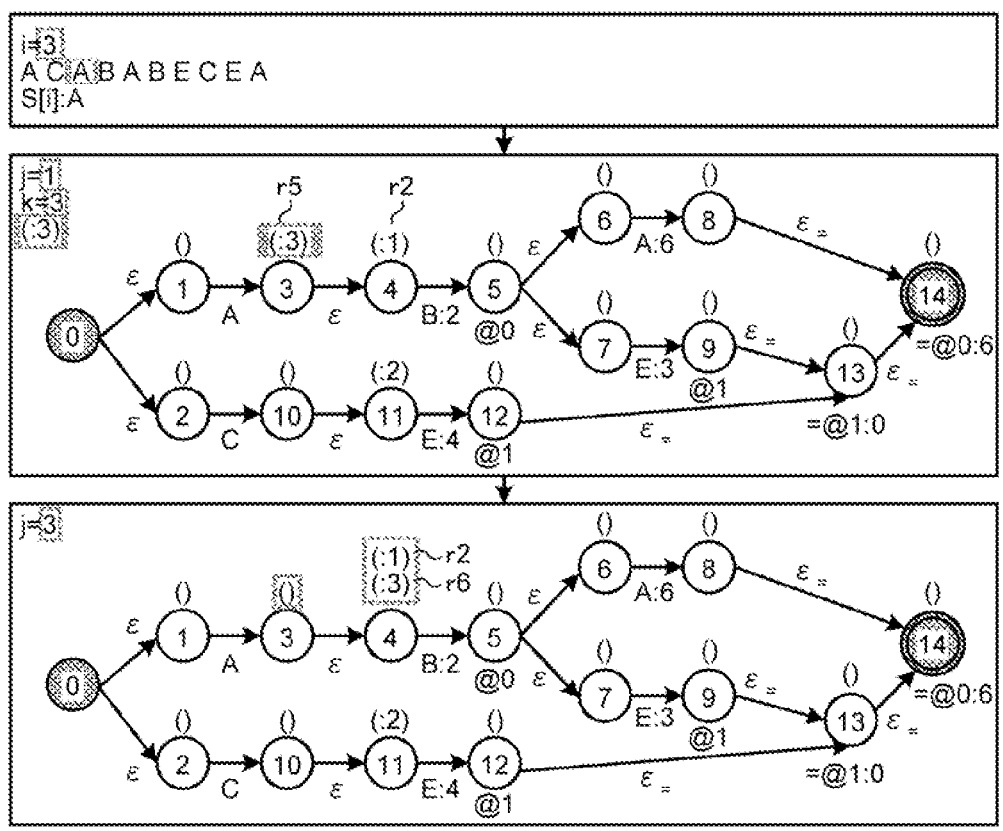
FIG. 17D is a diagram for explaining the process performed by the matching unit.

As illustrated in the first stage of FIG. 17D, the matching unit 150c sets the value of the current event position i to 3, and reads an event S[3] of the event position 3, or in other words the event "A", from the event streams 140c. That is, the matching unit 150c reads the event "A" of the time 3.

As illustrated in the second stage of FIG. 17D, the matching unit 150c initializes the value of the state j and the value of the transition destination state k, and sets the value of the state j to 1 and the value of the transition destination state k to 0. The matching unit 150c increments the value of the state j by 1, and determines whether a normal transition is effected from the state j for the event "A". Here, because a normal transition without an interval condition is effected from the state 1 for the event "A", the matching unit 150c sets the tentative list to a blank one. Then, the matching unit 150c sets the state k to the state 3, which is the normal transition destination of the state 1. Then, because no @ number is assigned to the state 3, the matching unit 150c sets the current event position 3 to the final reception position of the tentative list, and adds the set-up tentative list as the event list r5 of the state 3.

Thereafter, although a normal transition with an interval condition is effected from the state 6 for the event "A", there is no unprocessed event list in the state 6, and therefore there is no target to compare regarding the interval condition. Thus, the matching unit 150c continues the process without any change. Then, because no normal transition is effected from the states 7 to 14 for the event "A", the matching unit 150c terminates the activation of all the normal transitions for the event "A" of the current event position 3 (time 3).

As illustrated in the third stage of FIG. 17D, the matching unit 150c executes the activation of all the $\epsilon$ transitions and $\epsilon$_transitions from the state j, while incrementing the value of the state j by 1. Because an $\epsilon$ transition is effected from the state 3, the matching unit 150c adds the event list r5 of the state 3 as the event list r6 of the state 4 that is the transition destination, and deletes the event list r5 of the state 3. Then, when the process is completed for up to the state 14, the matching unit 150c terminates the activation of all the $\epsilon$ transitions and $\epsilon$_transitions.

Figure 17E:
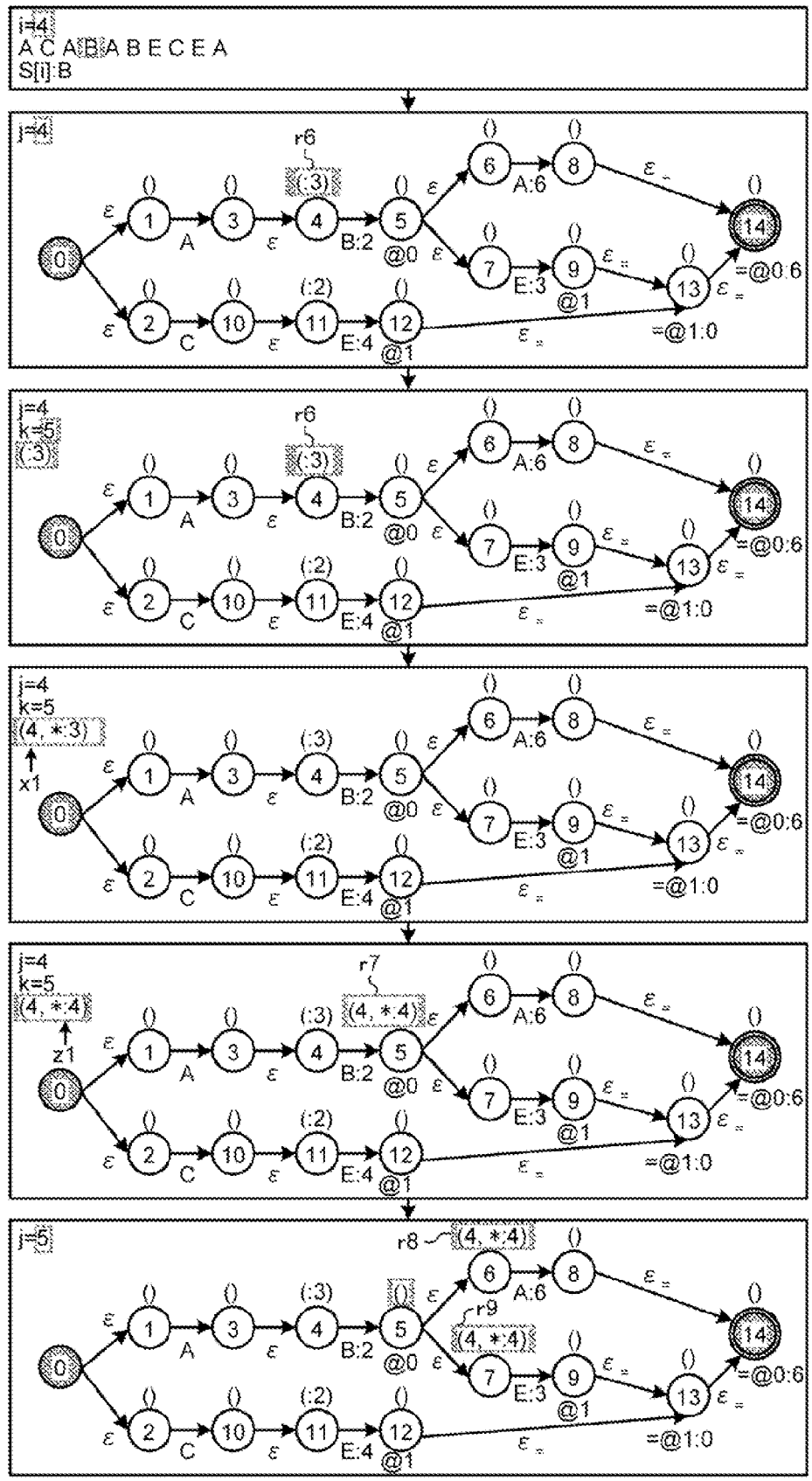
FIG. 17E is a diagram for explaining the process performed by the matching unit.

As illustrated in the first stage of FIG. 17E, the matching unit 150c sets the value of the current event position i to 4, and reads an event S[4] of the event position 4, or in other words the event "B", from the event streams 140c. That is, the matching unit 150c reads the event "B" of the time 4.

As illustrated in the second stage of FIG. 17E, the matching unit 150c initializes the value of the state j and the value of the transition destination state k, and sets the value of the state j to 1 and the value of the transition destination state k to 0. The matching unit 150c increments the value of the state j by 1, and determines whether a normal transition is effected from the state j for the event "B". Here, a normal transition with an interval condition is effected from the state 4 for the event "B", the matching unit 150c selects an unprocessed event list r2 of the state 4, and determines whether the final reception position of the selected event list r2 and the current event position 4 satisfy the interval condition. Because the final reception position of the selected event list r2 is 1 and the interval between the final reception position and the current event position 4 is 3, the matching unit 150c determines that the interval condition 2 is not satisfied, and deletes the event list r2.

As illustrated in the third stage of FIG. 17E, the matching unit 150c selects the unprocessed event list r6 of the state 4, and determines whether the final reception position of the selected event list r6 and the current event position 4 satisfy the interval condition. Because the final reception position of the selected event list r6 is 3 and the interval between the final reception position and the current event position 4 is 1, the matching unit 150c determines that the interval condition 2 is satisfied. Then, the matching unit 150c copies the event list r6 into the tentative list, and sets the state k to the state 5 that is the normal transition destination of the state 4.

As illustrated in the fourth stage of FIG. 17E, because the @ number 0 is assigned to the state 5, the matching unit 150c writes the current event position 4 at a @ number position x1 of the tentative list.

As illustrated in the fifth stage of FIG. 17E, the matching unit 150c sets the final reception position z1 of the tentative list to the current event position 4. Then, the matching unit 150c adds the tentative list as the event list r7 of the state 5. Then, because no normal transition for the event "B" is effected from the states 5 to 14, the matching unit 150c terminates the activation of all the normal transitions for the event "B" of the current event position 4 (time 4).

As illustrated in the sixth stage of FIG. 17E, the matching unit 150c executes the activation of all the ϵ transitions and ϵ_transitions from the state j, while incrementing the value of the state j by 1. Because there are ϵ transitions from the state 5 to the state 6 and to the state 7, the matching unit 150c adds the event list r7 of the state 5 as the event lists r8 and r9 of the states 6 and 7, respectively, that are transition destinations. Then, the matching unit 150c deletes the event list r7 of the state 5. Then, when the process is completed for up to the state 14, the matching unit 150c terminates the activation of all the ϵ transitions and ϵ_transitions.

Figure 17F:
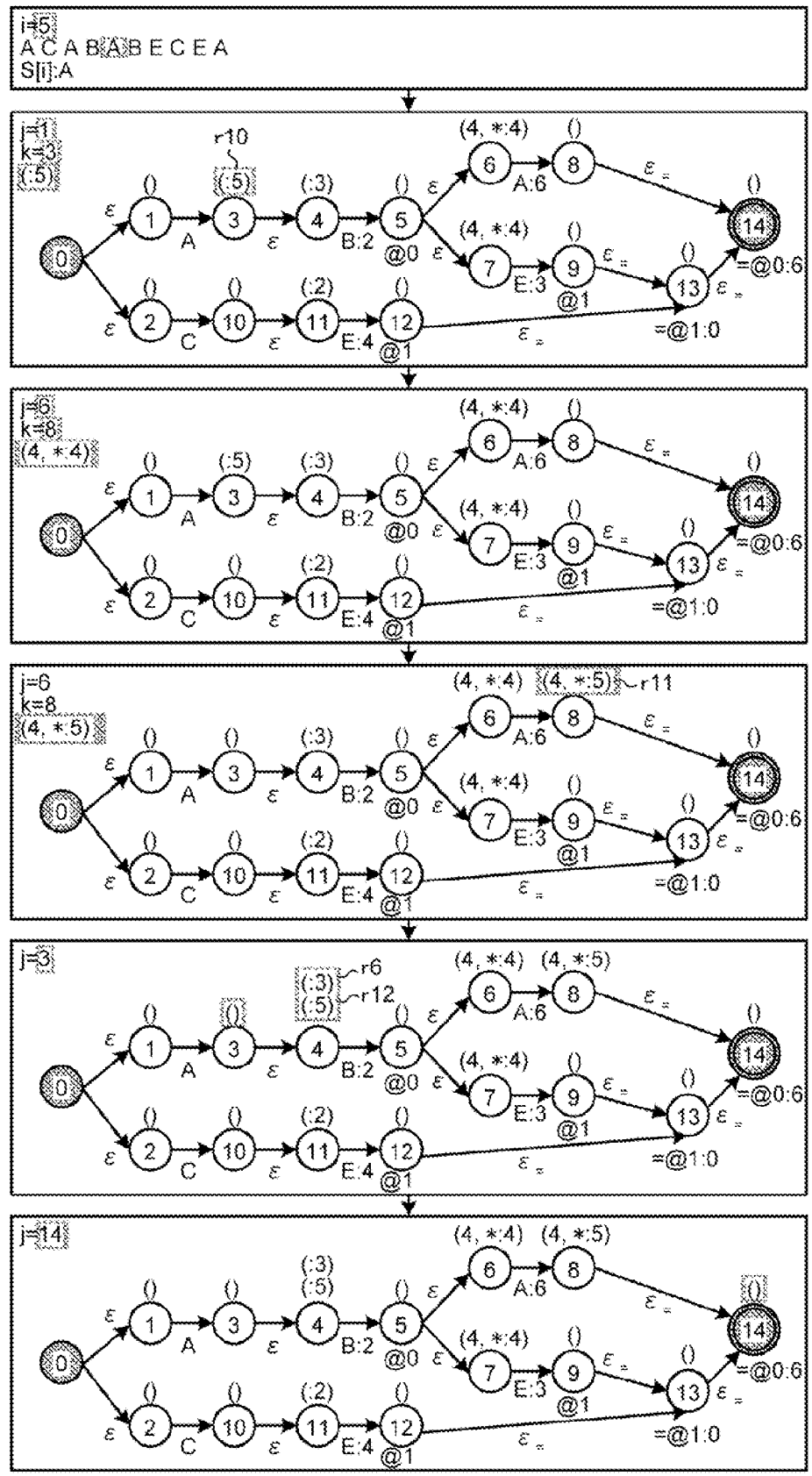
FIG. 17F is a diagram for explaining the process performed by the matching unit.

As illustrated in the first stage of FIG. 17F, the matching unit 150c sets the value of the current event position i to 5, and reads an event S[5] of the event position 5, in other words the event "A", from the event streams 140c. That is, the matching unit 150c reads the event "A" of the time 5.

As illustrated in the second stage of FIG. 17F, the matching unit 150c initializes the value of the state j and the value of the transition destination state k, and sets the value of the state j to 1 and the value of the transition destination state k to 0. The matching unit 150c increments the value of the state j by 1, and determines whether a normal transition is effected from the state j for the event "A". Here, because a normal transition with no interval condition is effected from the state 1 for the event "A", the matching unit 150c sets the tentative list as a blank one. Then, the matching unit 150c sets the state k to the state 3, which is the normal transition destination of the state 1. Thereafter, because no @ number is not assigned to the state 3, the matching unit 150c sets the final reception position of the tentative list to the current event position 5, and adds the set-up tentative list as the event list r10 of the state 3.

As illustrated in the third stage of FIG. 17F, because a normal transition with an interval condition is effected from the state 6 for the event "A", the matching unit 150c selects an unprocessed event list r8 of the state 6, and determines whether the final reception position of the selected event list r8 and the current event position 5 satisfy the interval condition. Because the final reception position of the selected event list r8 is 4, and the interval between the final reception position and the current event position 5 is 1, the matching unit 150c determines that the interval condition 6 is satisfied. Then, the matching unit 150c copies the event list r8 into the tentative list, and sets the state k to the state 8, which is the normal transition destination of the state 6.

As illustrated in the fourth stage of FIG. 17F, because no @ number is assigned to the state 8, the matching unit 150c sets the final reception position of the tentative list to the current event position 5, and adds the set-up tentative list as the event list r11 of the state 8. Then, because no normal transition for the event "A" is effected from the states 7 to 14, the matching unit 150c terminates the activation of all the normal transitions for the event "A" at the current event position 5 (time 5).

As illustrated in the fifth stage of FIG. 17F, the matching unit 150c increments the value of the state j by 1, and executes the activation of all the ϵ transitions and ϵ_transitions effected from the state j. Because an ϵ transition is effected from the state 3 to the state 4, the matching unit 150c adds the event list r10 of the state 3 as the event list r12 of the transition destination state 4. Then, the matching unit 150c deletes the event list r10 of the state 3.

As illustrated in the sixth stage of FIG. 17F, because the state 14 is a merging node, the matching unit 150c searches for event lists of the states 8 and 13, which are the ϵ_transition source of the state 14, in which the event positions of the @ number positions of the @ number 0 that is designated by the state 14 agree with each other. Here, because one of the ϵ_transition sources, the state 13, has no event list, no changes is made to the event list of the state 14. Then, the process is completed for up to the state 14, and thus the matching unit 150c terminates all the activation of the ϵ transitions and ϵ_transitions.

Figure 17G:
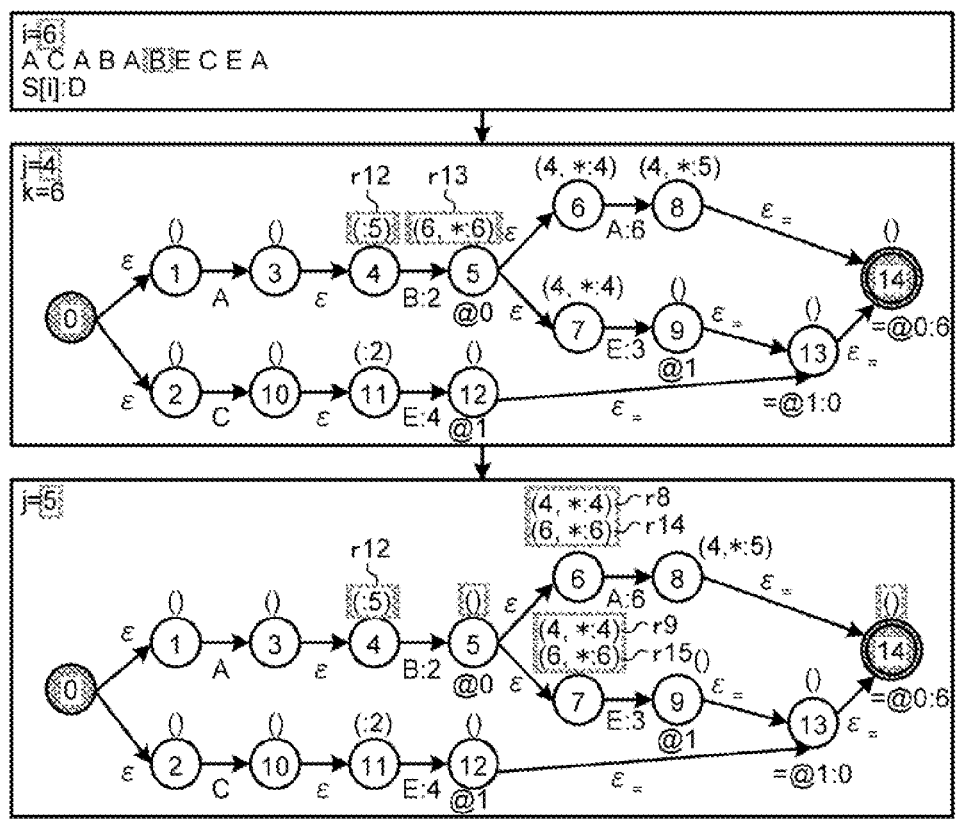
FIG. 17G is a diagram for explaining the process performed by the matching unit.

As illustrated in the first stage of FIG. 17G, the matching unit 150c sets the value of the current event position i to 6, and reads the event S[6] of the event position 4, in other words the event "B", from the event streams 140c. That is, the matching unit 150c reads the event "B" of the time 6.

As illustrated in the second stage of FIG. 17G, the matching unit 150c initializes the value of the state j and the value of the transition destination state k, and sets the value of the state j to 1 and the value of the transition destination state k to 0. The matching unit 150c increments the value of the state j by 1, and determines whether the normal transition for the event "B" is effected from the state j. Here, a normal transition with an interval condition for the event "B" is effected from the state 4, and thus the matching unit 150c selects an unprocessed event list r12 of the state 4 and determines whether the final reception position of the selected event list r12 and the current event position 6 satisfy the interval condition. Because the final reception position of the selected event list r12 is 5 and the interval between this position and the current event position 6 is 1, the matching unit 150c determines that the interval condition 2 is satisfied. Then, the matching unit 150c copies this event list r12 into the tentative list, and sets the state k to the state 5, which is the normal transition destination of the state 4. Because the @ number 0 is assigned to the state 5, the matching unit 150c writes the current event position 6 to the @ number of the tentative list. Then, the matching unit 150c sets the final reception position of the tentative list to the current event position 6. Thereafter, the matching unit 150c adds the tentative list to the event list r13 of the state 5. Then, because no normal transition is effected from the states 5 to 14 for the event "B", the matching unit 150c terminates the activation of all the normal transitions for the event "B" of the current event position 6 (time 6).

As illustrated in the third stage of FIG. 17G, the matching unit 150c increments the value of the state j by 1, and executes the activation of all the ϵ transitions and ϵ_transitions from the state j. Because an ϵ transition is effected from the state 5 to each of the states 6 and 7, the matching unit 150c adds the event list r13 of the state 5 as the event lists r14 and r15 of the transition destination states 6 and 7, respectively. Then, the matching unit 150c deletes the event list r13 of the state 5. Thereafter, when the process is completed for up to the state 14, the matching unit 150c terminates the activation of all the ϵ transitions and the ϵ_transitions.

Figure 17H:
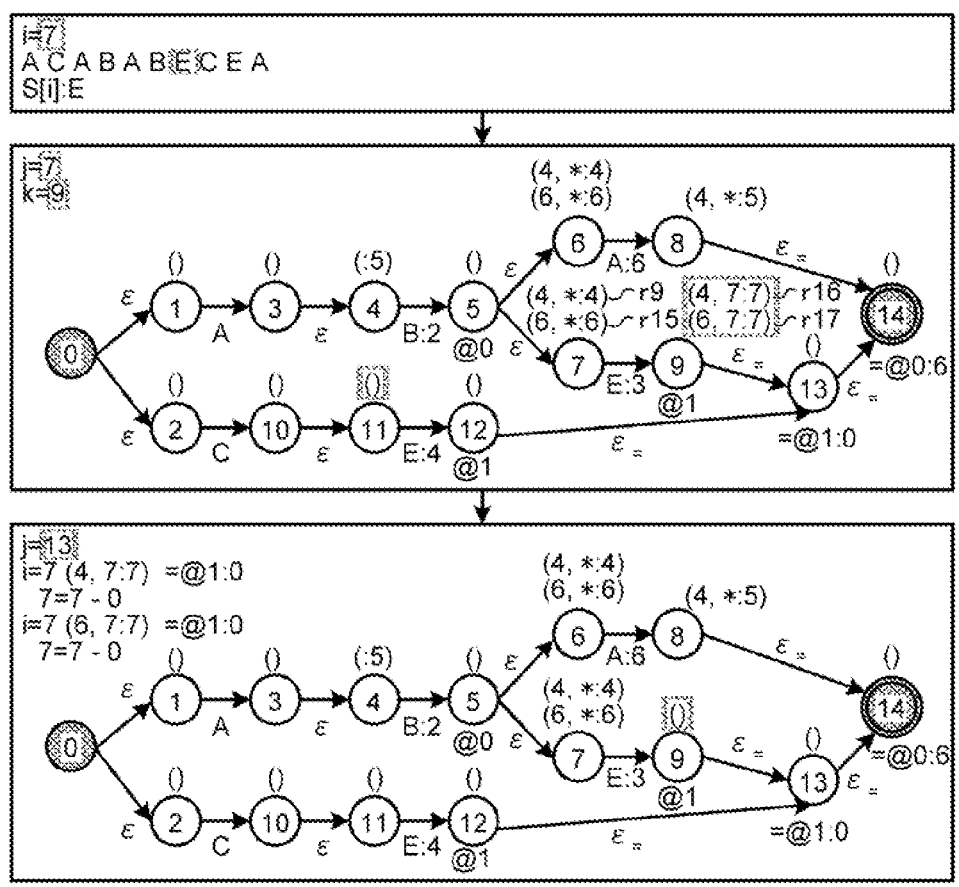
FIG. 17H is a diagram for explaining the process performed by the matching unit.

As illustrated in the first stage of FIG. 17H, the matching unit 150c sets the value of the current event position i to 7, and reads the event S[7] of the event position 7, in other words, the event "E", from the event streams 140c. That is, the matching unit 150c reads the event "E" of the time 7.

As illustrated in the second stage of FIG. 17H, the matching unit 150c initializes the value of the state j and the value of the transition destination state k, and sets the value of the state j to 1 and the value of the transition destination state k to 0. The matching unit 150c increments the value of the state j by 1, and determines whether a normal transition for the event "E" is effected from the state j. Here, a normal transition with an interval condition for the event "E" is effected from the state 7, the matching unit 150c selects an unprocessed event list r9 of the state 7, and determines whether the final reception position of the selected event list r9 and the current event position 7 satisfy the interval condition. The final reception position of the selected event list r9 is 4, and the interval between this position and the current event position 7 is 3. Thus, the matching unit 150c determines that the interval condition 3 is satisfied. Then, the matching unit 150c copies this event list r9 into the tentative list, and sets the state k to a state 9, which is the normal transition destination of the state 7. Then, because the @ number 1 is assigned to the state 9, the matching unit 150c writes the current event position 7 to the @ number position of the @ number 1 in the tentative list. Then, the matching unit 150c sets the final reception position of the tentative list to the current event position 7. Then, the matching unit 150c adds the tentative list to the event list r16 of the state 9.

Next, the matching unit 150c selects an unprocessed event list r15 of the state 7, and determines whether the final reception position of the selected event list r15 and the current event position 7 satisfy the interval condition. The final reception position of the selected event list r15 is 6, and the interval between this position and the current event position 7 is 2. Thus, the matching unit 150c determines that the interval condition 3 is satisfied. Then, the matching unit 150c copies the event list r15 to the tentative list, and sets the state k to the state 9, which is the normal transition destination of the state 7. Then, because the @ number 1 is assigned to the state 9, the matching unit 150c writes the current event position 7 in the @ number position of the @ number 1 in tentative list. Then, the matching unit 150c sets the final reception position of the tentative list to the current event position 7. Thereafter, the matching unit 150c adds the tentative list as the event list r17 of the state 9. Because no normal transition for the event "E" is effected from the states 8 and 14, the matching unit 150c terminates the activation of all the normal transitions of the current event position 7 (time 7) for the event "E".

As illustrated in the third stage of FIG. 17H, the matching unit 150c increments the value of the state j by 1, and executes the activation of all the ϵ transitions and ϵ_transitions from the state j. Because the state 13 is a merging node, the matching unit 150c searches for event lists of the states 9 and 12 that are the ϵ_transition sources of the state 13 in which the event positions of the @ number positions of the @ number 1 designated by the state 13 agree with each other. Here, because there is no event list in one of the ϵ_transition sources, the state 12, no change is made to the event list of the state 13.

Thereafter, the matching unit 150c takes event positions that correspond to the @ number 1 designated by the state 13 (the reception time of @1) from the event lists r16 and r17 of the states 9 and 12 that are the ϵ_transition sources of the state 13. Here, the matching unit 150c takes 7 from the event list r16, and 7 from the event list r17. Then, the matching unit 150c determines whether the taken-out event position is equal to or smaller than {"the current event position"–"the time-out length corresponding to the @ number 1 of the state 13"}. Here, the taken-out event position is 7, the current event position is 7, and the time-out length corresponding to the @ number 1 of the state 13 is 0, which means "7=7–0". The matching unit 150c therefore determines that it is a time-out, and deletes the event lists r16 and r17.

Next, the state 14 is a merging node, but the state 13 that is one of the ϵ_transition sources of the state 14, the states 8 and 13, does not have an event list. Thus, no change is made to the event list of the state 14. Then, the event position corresponding to the @ number 0 designated by the state 14 in the event list r11 of the state 8 is 4, which means "4>7–6". Thus, the matching unit 150c determines that it is not a time-out, and leaves the event list r11 unchanged. Then, because the process is completed for up to the state 14, the matching unit 150c terminates the activation of all ϵ transitions and ϵ_transitions.

Figure 17I:
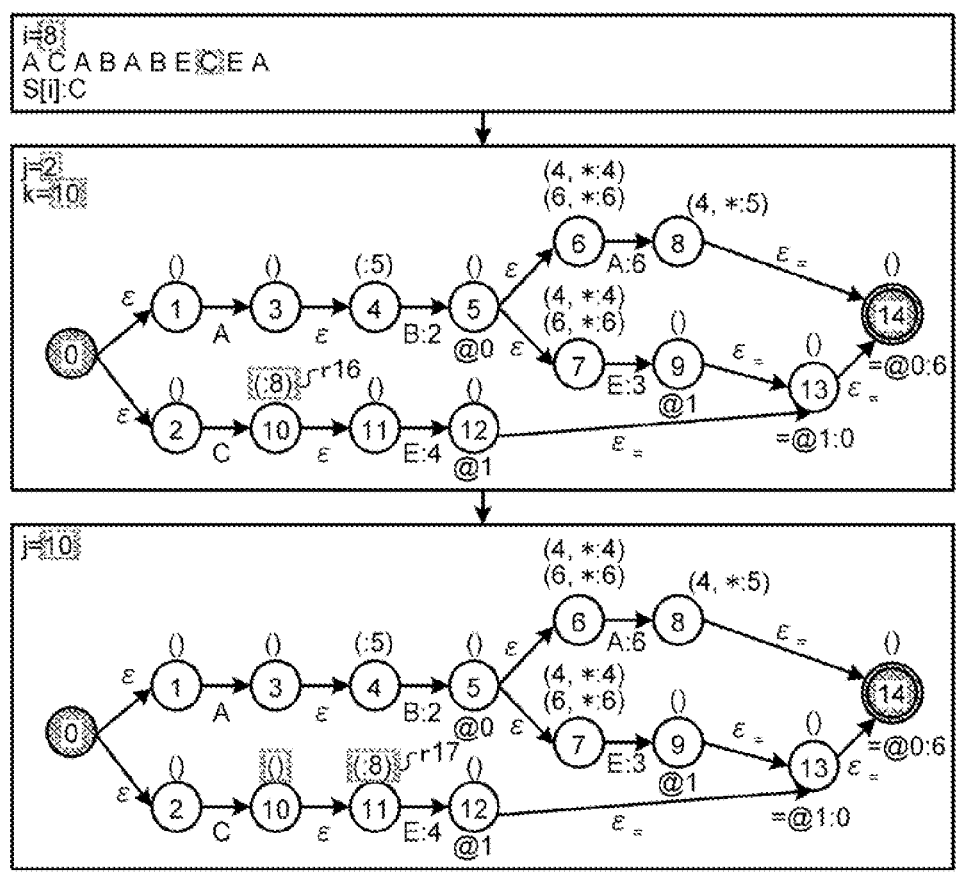
FIG. 17I is a diagram for explaining the process performed by the matching unit.

As illustrated in the first stage of FIG. 17I, the matching unit 150c sets the value of the current event position i to 8, and reads the event S[8] of the event position 1, or in other words, the event "C", from the event streams 140c. That is, the matching unit 150c reads the event "C" of the time 8.

As illustrated in the second stage of FIG. 17I, the matching unit 150c initializes the value of the state j and the value of the transition destination state k, and sets the value of the state j to 1 and the value of the transition destination state k to 0. The matching unit 150c increments the value of the state j by 1, and determines whether a normal transition for the event "C" is effected from the state j. Here, a normal transition with no interval condition for the event "C" is effected from the state 2, and thus the matching unit 150c sets the tentative list to a blank one and the state k to the state 10 that is the normal transition destination of the state 2.

Next, because no @ number is assigned to the state 10, the matching unit 150c sets the final reception position of the tentative list to the current event position 8, and adds the set-up tentative list as the event list r16 of the state 10. Then, because no normal transition for the event "C" is effected from the states 3 to 14, the matching unit 150c terminates the activation of all the normal transitions of the current event position 8 (time 8) for the event "C".

As illustrated in the third stage of FIG. 17I, the matching unit 150c increments the value of the state j by 1, and executes the activation of all the ϵ transitions and ϵ_transitions from the state j. Because an ϵ transition is effected from the state 10, the matching unit 150c adds the event list r16 of the state 10 as the event list r17 of the transition destination state 11, and deletes the event list r16 of the state 10. Then, when the process is completed for up to the state 14, the matching unit 150c terminates the activation of all the ϵ transitions and ϵ_transitions.

Figure 17J:
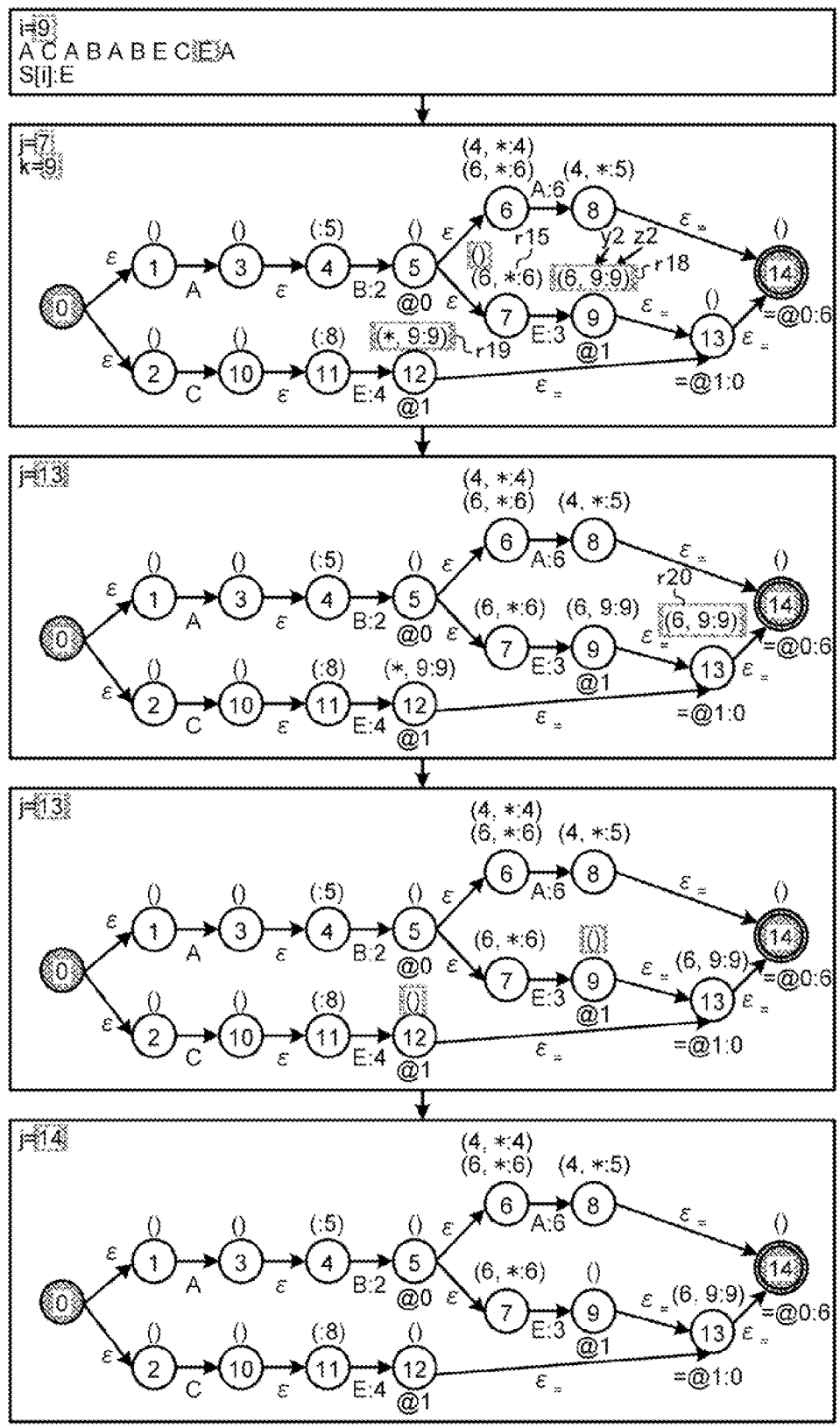
FIG. 17J is a diagram for explaining the process performed by the matching unit.

As illustrated in the first stage of FIG. 17J, the matching unit 150c sets the value of the current event position i to 9, and reads the event S[9] of the event position 9, or in other words, the event "E", from the event streams 140c. That is, the matching unit 150c reads the event "E" of the time 9.

As illustrated in the second stage of FIG. 17J, the matching unit 150c initializes the value of the state j and the value of the transition destination state k, and sets the value of the state j to 1 and the value of the transition destination state k to 0. The matching unit 150c increments the value of the state j by 1, and determines whether a normal transition for the event "E" is effected from the state j. Here, because a normal transition with an interval condition for the event "E" is effected from the state 7, the matching unit 150c selects an unprocessed event list r9 of the state 7, and determines whether the final reception position of the selected event list r9 and the current event position 9 satisfy the interval condition. The final reception position of the selected event list r9 is 4, and the interval between this position and the current event position 9 is 5, which exceeds the interval condition 3. Thus, the matching unit 150c determines that the interval condition 3 is not satisfied. Then, the matching unit 150c deletes this event list r9.

Thereafter, the matching unit 150c selects an unprocessed event list r15 of the state 7, and determines whether the final reception position of the selected event list r15 and the current event position 7 satisfy the interval condition. Because the final reception position of the selected event list r15 is 6 and the interval between this position and the current event position 9 is 3, the matching unit 150c determines that the interval condition 3 is satisfied. Then, the matching unit 150c copies this event list r15 into the tentative list, and sets the state k to the state 9 that is the normal transition destination of the state 7. Then, because the @ number 1 is assigned to the state 9, the matching unit 150c writes the current event position 9 in the @ number position y2 of the @ number 1 in the tentative list. Thereafter, the matching unit 150c sets the final reception position z2 of the tentative list to the current event position 9. Then, the matching unit 150c adds the tentative list as the event list r18 of the state 9.

Moreover, because a normal transition with an interval condition is effected from the state 11 for the event "E", the matching unit 150c performs processing in the same manner as for the state 7. In other words, the matching unit 150c sets the @ number position to the current event position 9 and the final reception position to 9 and adds the resultant tentative list as the event list r19 of the state 12. Then, no normal transition is effected from the states 12 to 14 for the event "E", and thus the matching unit 150c terminates the activation of all the normal transitions of the current event position 9 (time 9) for the event "E".

As illustrated in the third stage of FIG. 17J, the matching unit 150c executes the activation of all the ϵ transitions and ϵ_transitions effected from the state j while incrementing the value of the state j by 1. Because the state 13 is a merging node, the matching unit 150c searches for event lists of the states 9 and 12 that are the ϵ_transition sources of the state 13 in which the event positions of the @ number positions of the @ number 1 designated by the state 13 agree with each other. Here, the event position corresponding to the designated @ number 1 in the event list r18 of the state 9 and the event position corresponding to the designated @ number 1 in the event list r19 of the state 12 are both 9 and agree with each other. Thus, the matching unit 150c combines the event lists r18 and r19, and adds the combined event list r20 to the state 13.

As illustrated in the fourth stage of FIG. 17J, the matching unit 150c takes an event position corresponding to the @ number 1 designated by the state 13 (the reception time of @1) from the event lists r18 and r19 of the states 9 and 12 that are the ϵ_transition sources of the state 13. Here, the matching unit 150c takes 9 from the event list r18, and 9 from the event list r19. Then, the matching unit 150c determines whether the taken-out event positions are smaller than or equal to {"the current event position"-"the time-out length corresponding to the @ number 1 of the state 13"}. Here, the taken-out event position is 9, the current event position is 9, and the time-out length corresponding to the @ number 1 of the state 13 is 0, which means "9=9-0". Hence, the matching unit 150c determines that it is a time-out, and deletes the event lists r18 and r19.

As illustrated in the fifth stage of FIG. 17J, because the state 14 is a merging node, the matching unit 150c searches for event lists of the states 8 and 13 that are the ϵ_transition sources of the state 14 in which the event positions of the @ number positions of the @ number 0 designated by the state 14 agree with each other. Here, the event position corresponding to the designated @ number 0 in the event list r11 of the state 8 is 4, the event position corresponding to the designated @ number 0 in the event list r20 of the state 13 is 6, which means that the event positions do not agree with each other. Thus, no change is made to the event list of the state 14. Then, because the processing is completed for up to the state 14, the matching unit 150c terminates the activation of all the ϵ transitions and ϵ_transitions.

Figure 17K:
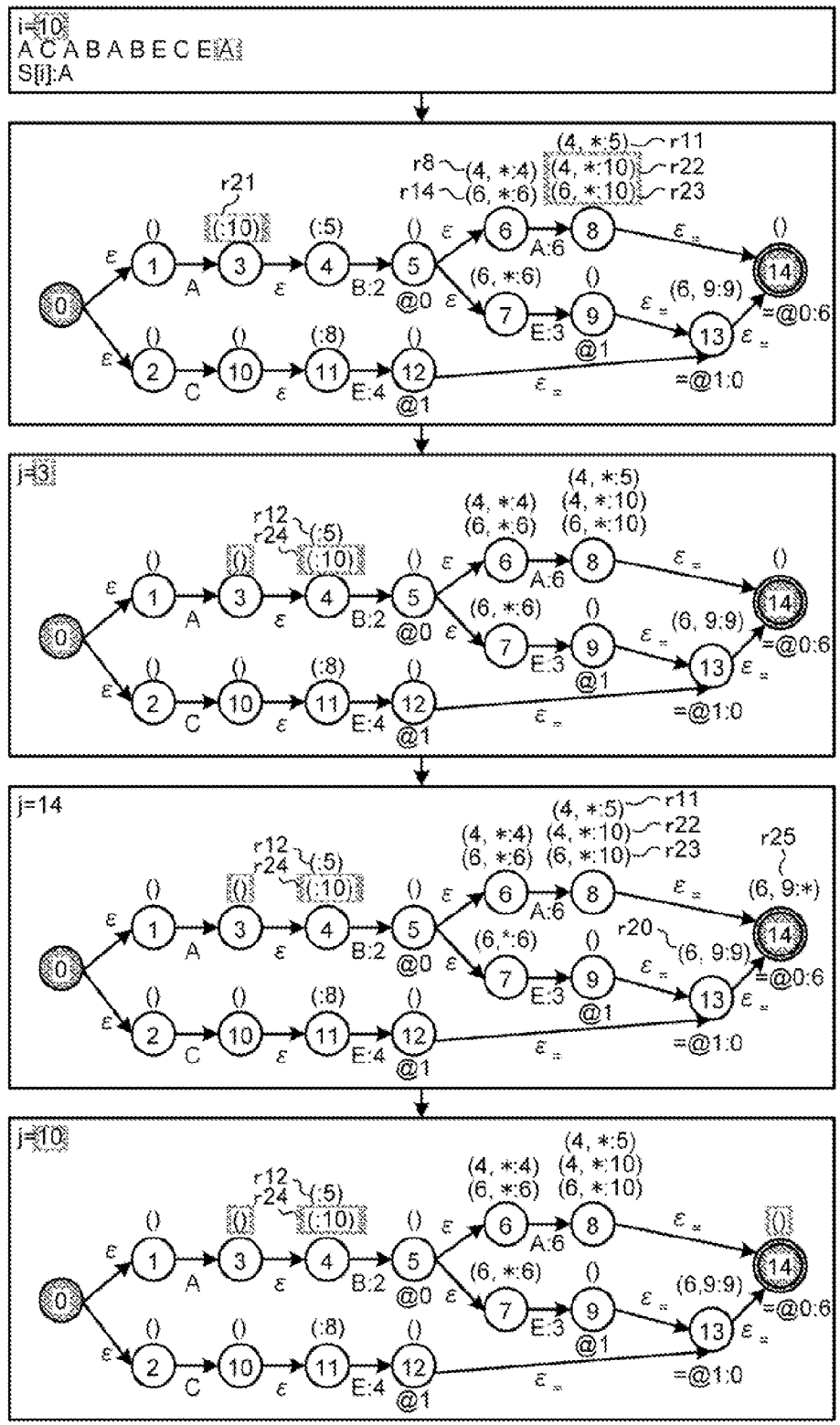
FIG. 17K is a diagram for explaining the process performed by the matching unit.

As illustrated in the first stage of FIG. 17K, the matching unit 150c sets the value of the current event position i to 10, and reads the event S[10] of the position 10, or in other words, the event "A", from the event streams 140c. That is, the matching unit 150c reads the event "A" of the time 10.

As illustrated in the second stage of FIG. 17K, the matching unit 150c initializes the value of the state j and the value of the transition destination state k, and sets the value of the state j to 1 and the value of the transition destination state k to 0. The matching unit 150c increments the value of the state j by 1, and determines whether a normal transition for the event "A" is effected from the state j. Here, a normal transition with no interval condition for the event "A" is effected from the state 1, and thus the matching unit 150c sets the tentative list to a blank one. Then, the matching unit 150c sets the state k to the state 3 that is the normal transition destination of the state 1. Then, because no @ number is assigned to the state 3, the matching unit 150c sets the final reception position of the tentative list to the current event position 10 and adds the set-up tentative list as the event list r21 of the state 3.

Thereafter, because a normal transition with an interval condition is effected for the event "A" from the state 6, the matching unit 150c selects an unprocessed event list r8 of the state 6, and determines whether the final reception position of the selected event list r8 and the current event position 10 satisfy the interval condition. The final reception position of the selected event list r8 is 4, and the interval between this position and the current event position 10 is 6. Thus, the matching unit 150c determines that the interval condition 6 is satisfied. Then, the matching unit 150c copies this event list r8 into the tentative list, and sets the state k to the state 8 that is the normal transition destination of the state 6. Because no @ number is assigned to the state 8, the matching unit 150c sets the final reception position of the tentative list to the current event position 10, and adds the set-up tentative list as the event list r22 of the state 8.

Next, the matching unit 150c performs processing for the unprocessed event list r14 of the state 6 in the same manner as for the event list r8, and adds the event list r23 to the state 8. Then, because no normal transition for the event "A" is effected from the states 7 to 14, the matching unit 150c terminates the activation of all the normal transitions for the event "A" at the current event position 10 (time 10).

As illustrated in the third stage of FIG. 17K, the matching unit 150c executes the activation of all the ϵ transitions and ϵ_transitions effected from the state j, while incrementing the value of the state j by 1. Because an ϵ transition is effected from the state 3 to the state 4, the matching unit 150c adds the event list r21 of the state 3 as the event list r24 of the state 4 that is the transition destination, and deletes the event list r21 of the state 3.

As illustrated in the fourth stage of FIG. 17K, because the state 14 is a merging node, the matching unit 150c searches for event lists of the states 8 and 13 that are the ϵ_transition sources of the event list state 14 in which the event positions of the @ number positions of the @ number 0 designated by the state 14 agree with each other. Here, the event position corresponding to the designated @ number 0 in the event list r23 of the state 8 and the event position corresponding to the designated @ number 0 in the event list r20 of the state 13 are both 6 and agree with each other. Thus, the matching unit 150c combines the event lists r23 and r20, and adds the combined event list r25 to the state 14.

As illustrated in the fifth stage of FIG. 17K, because the state 14 is a final state and there is an event list, the matching unit 150c provides notification of the current event position 10 as the matching result, and deletes the event list of the state 14. In other words, the matching unit 150c provides notification of the completion time of the event pattern, as a result of completing the matching. Then, because the processing is completed for up to the state 14, the matching unit 150c terminates the activation of all the ϵ transitions and ϵ_transitions.

By executing the above processing indicated in FIGS. 17A to 17K, the matching unit 150c checks the event streams 140c by using the NFAs 140b. The matching unit 150c notifies the user terminal 50 of the matching result. The matching unit 150c may display the matching result onto the displaying unit 130. In the above FIGS. 17A to 17K, the completion time of the event patterns 140a in the event streams 140c is adopted as the matching result, but the matching result may include a start time.

Effects of Present Embodiment

Next, the effects of the matching apparatus 100 according to the present embodiment are explained. With respect to a branching pattern included in the event patterns 140a, the matching apparatus 100 holds the reception time of an event that is the branching point of the branching pattern, in association with a source node that indicates the transition destination of this event. Moreover, the matching apparatus 100 connects the source node to a branch node that associates an event that is as a branch of the branching pattern with an interval condition. In addition, the matching apparatus 100 generates the NFAs 140b by connecting multiple branch nodes to a link node that indicates a linkage point combining the branch nodes. Then, the matching apparatus 100 sequentially compares the event streams 140c that includes the occurrence order of the events with the NFAs 140b, and when the event that serves as the branching point of the branching pattern is received by the source node, the matching apparatus 100 holds the reception time of the received event in association with the source node. Further, when an event subsequent to the event of the branching event is received at the branch node, the matching apparatus 100 effects a transition of the stored reception time together with the reception state of the branch node, if the reception of the received event satisfies the interval condition that is associated with the branch node. Moreover, when the same-time reception times are found among the reception times transferred from the branch nodes at the link node, the matching apparatus 100 further transfers the linking state including the reception time, and thereby determines whether the event streams 140c include the event patterns 140a. With the matching apparatus 100, even if a branching pattern of an event pattern has an interval condition between the events, the branching pattern of the events can be unerringly checked, and thus the event pattern can be efficiently checked.

In addition, regarding a linking pattern included in the event patterns 140a, the matching apparatus 100 holds the reception time of an event that serves as the end point of the linkage of the linking pattern in association with branch nodes that are the transition destinations of the event. Moreover, the matching apparatus 100 further generates the NFAs 140b by connecting the multiple branch nodes to the link node that indicates a linking point for linking the branch nodes. Then, when the event that serves as the end point of the linking pattern is received by the branch node, the matching apparatus 100 duplicates the reception state of the transition source and also holds the reception time of the received event in association with the branch node. Furthermore, the matching apparatus 100 transfers this reception time to the link node together with the duplicated reception state. In addition, when there are same-time reception times of the event of the end point at the link node among the reception times transferred from the multiple branch nodes, the matching apparatus 100 further transfers the linking state including this reception time. Thus, with the matching apparatus 100, even when the linking pattern of the event pattern has an interval condition between the events, the matching can be unerringly performed for the linking pattern of the events. Hence, the matching of the event pattern can be efficiently performed.

Programs and Like

The matching apparatus 100 can be realized by incorporating the above functions such as the NFA generating unit 150b and the matching unit 150c onto the known information processing apparatus such as a personal computer and a workstation.

In addition, the structural components of the illustrated apparatus do not always have to be physically designed as illustrated in the drawings. In other words, the specific design of the distribution and combination of the apparatus is not limited to the illustrated one, and the entire design or part of it can be functionally or physically distributed or combined in arbitrary units in accordance with various loads and usages. For example, the NFA generating unit 150b and the matching unit 150c may be combined into one unit, or the NFA generating unit 150b may be divided into a first generating unit that generates an NFA for a branching pattern and a second generating unit that generates an NFA for a linking pattern. Moreover, the storage unit for storing the NFAs 140b or the like may be connected as an external device to the matching apparatus 100 by way of a network.

Figure 18:
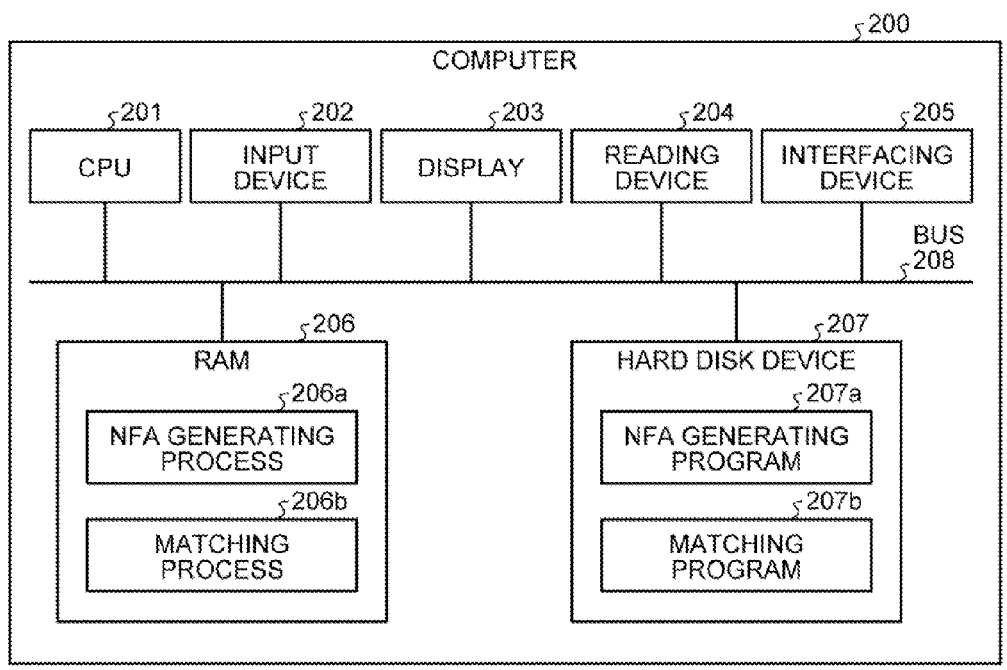
FIG. 18 is a diagram for illustrating an example of a computer that executes the matching program.
Figures 19, 20:
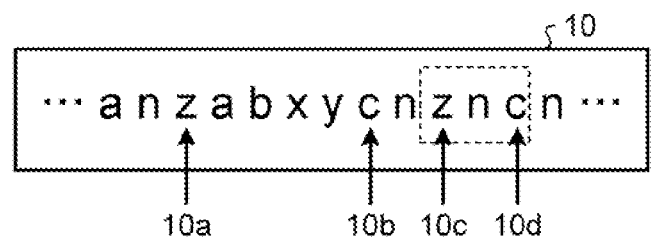
FIG. 19 is an example of an event stream.
FIG. 20 is a diagram in which events and descriptions of the events are associated with each other.

The processes explained in the above embodiment can be realized by executing a programs prepared in advance on a computer such as a personal computer and a workstation. In the following explanation, an example of a computer that executes a matching program to realize the same functions as the matching apparatus 100 illustrated in FIG. 2 is introduced. FIG. 18 is a diagram for illustrating an example of a computer that executes a matching program.

As illustrated in FIG. 18, a computer 200 includes a CPU 201 that executes various computing processes, an input device 202 that receives data input from a user, and a display 203. Furthermore, the computer 200 includes a reading device 204 that reads programs and the like from a recording medium and an interfacing device 205 that exchanges data with other computers by way of a network. Still further, the computer 200 includes a RAM 206 that temporarily stores therein various types of information and a hard disk device 207. These devices 201 to 207 are connected to a bus 208.

The hard disk device 207 stores therein an NFA generating program 207a and a matching program 207b. The CPU 201 reads the programs 207a and 207b and expands them onto the RAM 206. The NFA generating program 207a functions as an NFA generating process 206a. The matching program 207b functions as a matching process 206b.

For example, the NFA generating process 206a corresponds to the NFA generating unit 150b. The matching process 206b corresponds to the matching unit 150c.

The programs 207a and 207b do not have to be stored in advance in the hard disk device 207. For example, the programs may be stored in a "portable physical medium" that is inserted into the computer 200 such as a flexible disk (FD), a CD-ROM, a DVD disk, a magneto-optical disk, and an IC card. Then, the computer 200 may read the programs 207a and 207b from the medium and execute them.

With the conventional technology, matching of a parallel pattern of events with interval conditions cannot be efficiently conducted by use of an automaton.

Figure 21:
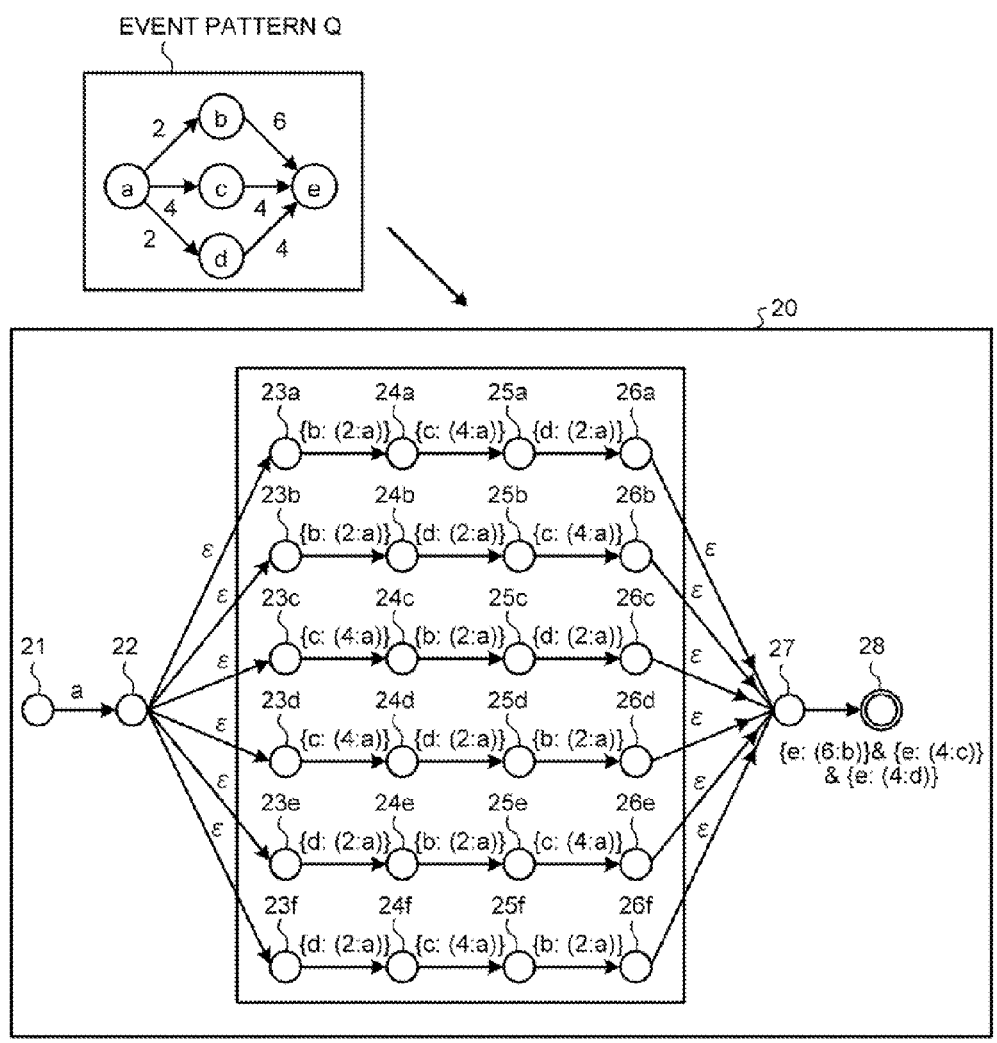
FIG. 21 is a diagram for illustrating an example of an automaton generated from an event pattern.

When an event pattern includes a parallel pattern of events with interval conditions, all the combinations of the events of the parallel pattern with the interval conditions in different occurrence orders have to be included in the automaton, as indicated in FIG. 21, which makes the process inefficient. For example, if a parallel pattern has the number m of events with interval conditions, on the order of O(m!) nodes may be required.

According to an embodiment of the present invention, the matching apparatus can efficiently check a parallel pattern of events with interval conditions by use of an automaton.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A matching apparatus, comprising:
a memory; and
a processor coupled to the memory, wherein the processor is configured to:
generate an automaton by performing, onto a branching pattern included in an event pattern that has an occurrence order of events and an interval condition, a process of storing a reception time of an event that serves as a branching point of the branching pattern in association with a source node that indicates a transition destination of the event, a process of connecting the source node to a branch node that brings an event that is a branch of the branching pattern into association with the interval condition, and a process of connecting multiple branch nodes to a link node that indicates a linking point at which the branch nodes are linked together; and
determine whether an event stream includes the event pattern by sequentially comparing the event stream that includes the occurrence order of the events with the automaton, storing, when the event that is the branching point of the branching pattern is received by the source node, a reception time of the event that is received in association with the source node, transferring the reception time that is stored, together with a reception state of the branch node, if reception of the event that is received satisfies the interval condition associated with the branch node when an event subsequent to the event that is the branching point is received by the branch node, and further transferring, a linking state that, if any of reception times transferred from the branch nodes includes the same reception time at the link node, includes the same reception time.

2. The matching apparatus according to claim 1, wherein:
the processor being further configured to:
further generate the automaton by performing, onto a linking pattern included in the event pattern, a process of storing a reception time of an event that is a linkage end point of the linking pattern in association with a branch node that indicates a transition destination of the event, and a process of connecting the multiple branch nodes to the link node that indicates the linking point at which the branch nodes are linked together, and
duplicate a reception state of a transition source when the event that is the linkage end point of the linking pattern is received by the branch node, stores the reception time of the event that is received in association with the branch node, transfers to the link node the reception time that is stored together with the reception state that is duplicated, and further transfers, if any of the reception times transferred from the branch nodes include the same reception time of the event that is the end point at the link node, a linking state including the reception time.

3. A non-transitory computer readable storage medium having stored therein a matching program that causes a computer to execute processes of:
generating an automaton by performing, onto a branching pattern included in an event pattern that has an occurrence order of events and an interval condition, a process of storing a reception time of an event that serves as a branching point of the branching pattern in association with a source node that indicates a transition destination of the event, a process of connecting the source node to a branch node that brings an event that serves as a branch of the branching pattern in association with the interval condition, and a process of connecting multiple branch nodes to a link node that indicates a linking point at which the branch nodes are linked together; and
determining whether an event stream includes the event pattern, by sequentially comparing the event stream that includes the occurrence order of the events with the automaton, storing, if the event that is the branching point of the branching pattern is received by the source node, a reception time of the event that is received in association with the source node, transferring, when an event subsequent to the event that is the branching point is received by the branch node, the reception time that is stored, together with a reception state of the branch node if reception of the event that is received satisfies the interval condition associated with the branch node, and further transferring, when any of reception times transferred from the branch nodes includes the same reception time at the link node, the linking state including the same reception time.

4. The non-transitory computer readable storage medium according to claim 3, wherein
the generating includes generating the automaton by performing, onto the linking pattern included in the event pattern, a process of storing the reception time of an event that is a linkage end point of the linking pattern in association with the branch node that indicates the transition destination of the event, and a process of connecting the branch nodes to the link node that indicates a linking point at which the branch nodes are linked together, and
the matching includes duplicating a reception state of a transition source when the event that is the linkage end point of the linking pattern is received by the branch node, storing the reception time of the event that is received in association with the branch node, transferring the reception time stored to the link node together with the reception state that is duplicated, and transferring, if any of the reception times transferred from the branch nodes includes the same reception time of the event that is the end point at the link node, the linking state including the reception time.

5. A matching apparatus, comprising:
a memory; and
a processor coupled to the memory, wherein the processor executes a process comprising:
generating an automaton by performing, onto a branching pattern included in an event pattern that has an occurrence order of events and an interval condition, a process of storing a reception time of an event that serves as a branching point of the branching pattern in association with a source node that indicates a transition destination of the event, a process of connecting the source node to a branch node that brings an event that serves as a branch of the branching pattern in association with the interval condition, and a process of connecting multiple branch nodes to a link node that indicates a linking point at which the branch nodes are linked together; and determining whether an event stream includes the event pattern, by sequentially comparing the event stream that includes the occurrence order of the events with the automaton, storing, if the event that is the branching point of the branching pattern is received by the source node, a reception time of the event that is received in association with the source node, transferring, when an event subsequent to the event that is the branching point is received by the branch node, the reception time that is stored, together with a reception state of the branch node if reception of the event that is received satisfies the interval condition associated with the branch node, and further transferring, when any of reception times transferred from the branch nodes includes the same reception time at the link node, the linking state including the same reception time.

* * * * *